US012787029B2

(12) United States Patent
Liu et al.

(10) Patent No.: US 12,787,029 B2
(45) Date of Patent: Nov. 3, 2026

(54) ENHANCED CONTROL FORMAT FEEDBACK

(71) Applicant: QUALCOMM Incorporated, San Diego, CA (US)

(72) Inventors: Kangqi Liu, San Diego, CA (US); Huilin Xu, Temecula, CA (US); Mostafa Khoshnevisan, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 317 days.

(21) Appl. No.: 18/734,987

(22) Filed: Jun. 5, 2024

(65) Prior Publication Data

US 2025/0380275 A1 Dec. 11, 2025

(51) Int. Cl.
*H04W 72/232* (2023.01)
*H04W 72/1273* (2023.01)

(52) U.S. Cl.
CPC ..... *H04W 72/232* (2023.01); *H04W 72/1273* (2013.01)

(58) Field of Classification Search
CPC ............ H04W 72/232; H04W 72/1273; H04L 1/1671; H04L 1/1864
See application file for complete search history.

(56) References Cited

U.S. PATENT DOCUMENTS

2021/0100013 A1* 4/2021 Khoshnevisan ...... H04L 1/1864
2021/0168776 A1* 6/2021 Li ......................... H04L 1/1812
2021/0176012 A1* 6/2021 Xu ........................ H04L 1/1812
2021/0321438 A1* 10/2021 Khoshnevisan ..... H04B 7/0417
(Continued)

OTHER PUBLICATIONS

ASUSTEK: “Discussion on PUCCH Carrier Switch for HARQ-ACK Enhancement”, 3GPP TSG RAN WG1 #106bis-e, R1-2110287, 3rd Generation Partnership Project, Mobile Competence Centre, 650, Route Des Lucioles, F-06921 Sophia-Antipolis Cedex, France, vol. RAN WG1, No. ,e-Meeting, Oct. 11, 2021-Oct. 19, 2021, Oct. 1, 2021, 3 pages, XP052059220, the whole document.
(Continued)

*Primary Examiner* — Ashley Shivers
(74) *Attorney, Agent, or Firm* — HOLLAND & HART LLP

(57) ABSTRACT

Methods, systems, and devices for wireless communications are described. A user equipment (UE) may monitor for a control message including scheduling information for a downlink message for the UE and command information instructing the UE to perform an operation. The operation may be to switch from a first mode or state (e.g., related to a bandwidth part (BWP), a secondary cell (SCell) dormancy state, a transmission configuration indication (TCI) state, a search space set group (SSSG), a minimum scheduling offset, or a combination thereof) to a second mode or state. The UE may generate feedback associated with the control message based on the monitoring. The feedback may indicate whether the UE successfully decoded the control message, whether the UE successfully received the downlink message, and whether the UE successfully performed the operation. The UE may transmit a feedback message including the generated feedback in accordance with a feedback configuration.

30 Claims, 16 Drawing Sheets

(56) References Cited

U.S. PATENT DOCUMENTS

2022/0361197 A1* 11/2022 Wang .................... H04L 1/1812
2024/0365318 A1* 10/2024 Khoshnevisan ...... H04L 1/1614

OTHER PUBLICATIONS

Huawei, et al., "Extensions to Rel-16 DCI-based Power Saving Adaptation for an Active BWP", 3GPP TSG RAN WG1 Meeting #107-e, R1-2110840, 3rd Generation Partnership Project , Mobile Competence Centre, 650, Route Des Lucioles, F-06921 Sophia-Antipolis Cedex France, vol. RAN WG1, No. ,e-Meeting, Nov. 11, 2021-Nov. 19, 2021, Nov. 6, 2021, 14 Pages, XP052074621, the whole document.
International Search Report and Written Opinion—PCT/US2025/029499—ISA/EPO—Aug. 22, 2025 (2402269WO).
NEC: "Discussion on Multi-beam Operation", 3GPP TSG RAN WG1 #104b-e, R1-2103521, 3rd Generation Partnership Project, Mobile Competence Centre, 650, Route Des Lucioles, F-06921 Sophia-Antipolis Cedex, France, vol. RAN WG1, No. ,e-Meeting, Apr. 12, 2021-Apr. 20, 2021, Apr. 7, 2021, 5 Pages, XP052178240, the whole document.

* cited by examiner

ENHANCED CONTROL FORMAT FEEDBACK

FIELD OF TECHNOLOGY

The following relates to wireless communications, including enhanced control format feedback.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The systems, methods, and devices of this disclosure each have several innovative aspects, no single one of which is solely responsible for the desirable attributes disclosed herein.

A method for wireless communications by a user equipment (UE) is described. The method may include monitoring for a control message including scheduling information for a downlink message for the UE and including command information instructing the UE to perform an operation, generating feedback associated with the control message based on the monitoring, the feedback indicating whether the UE successfully decoded the control message, whether the UE successfully received the downlink message, and whether the UE successfully performed the operation, and transmitting a feedback message including the generated feedback in accordance with a feedback configuration.

A UE for wireless communications is described. The UE may include one or more memories storing processor executable code, and one or more processors coupled with the one or more memories. The one or more processors may individually or collectively be operable to execute the code to cause the UE to monitor for a control message including scheduling information for a downlink message for the UE and including command information instructing the UE to perform an operation, generate feedback associated with the control message based on the monitoring, the feedback indicating whether the UE successfully decoded the control message, whether the UE successfully received the downlink message, and whether the UE successfully performed the operation, and transmit a feedback message including the generated feedback in accordance with a feedback configuration.

Another UE for wireless communications is described. The UE may include means for monitoring for a control message including scheduling information for a downlink message for the UE and including command information instructing the UE to perform an operation, means for generating feedback associated with the control message based on the monitoring, the feedback indicating whether the UE successfully decoded the control message, whether the UE successfully received the downlink message, and whether the UE successfully performed the operation, and means for transmitting a feedback message including the generated feedback in accordance with a feedback configuration.

A non-transitory computer-readable medium storing code for wireless communications is described. The code may include instructions executable by one or more processors to monitor for a control message including scheduling information for a downlink message for the UE and including command information instructing the UE to perform an operation, generate feedback associated with the control message based on the monitoring, the feedback indicating whether the UE successfully decoded the control message, whether the UE successfully received the downlink message, and whether the UE successfully performed the operation, and transmit a feedback message including the generated feedback in accordance with a feedback configuration.

In some examples of the method, UEs, and non-transitory computer-readable medium described herein, monitoring for the control message may include operations, features, means, or instructions for receiving, in the control message, the command information instructing the UE to switch from a first BWP to a second BWP, from a first SCell dormancy state to a second SCell dormancy state, from a first TCI state to a second TCI state, from a first SSSG to a second SSSG, from a first minimum scheduling offset to a second minimum scheduling offset, or a combination thereof.

Some examples of the method, UEs, and non-transitory computer-readable medium described herein may further include operations, features, means, or instructions for receiving an indication of the feedback configuration via a radio resource control (RRC) message or a medium access control-control element (MAC-CE).

In some examples of the method, UEs, and non-transitory computer-readable medium described herein, monitoring for the control message may include operations, features, means, or instructions for receiving the control message in accordance with a subcodebook of a set of multiple subcodebooks, where each subcodebook of the set of multiple subcodebooks may be associated with a respective downlink control information (DCI) format, and where the feedback may be a 2-bit message based on the subcodebook may be associated with a two-bit DCI format.

In some examples of the method, UEs, and non-transitory computer-readable medium described herein, monitoring for the control message may include operations, features, means, or instructions for receiving, in the control message, a BWP indicator, an SCell dormancy indication, a TCI state indication, a minimum scheduling offset indicator, or a combination thereof.

Some examples of the method, UEs, and non-transitory computer-readable medium described herein may further include operations, features, means, or instructions for failing to decode the control message based on the monitoring and maintaining one or more UE operations according to a current BWP indicator, a current SCell dormancy indication, a current TCI state indication, a current scheduling offset indicator, or a combination thereof based on a failure to decode the control message.

In some examples of the method, UEs, and non-transitory computer-readable medium described herein, generating the feedback may include operations, features, means, or instructions for generating feedback indicating that the UE successfully decoded the control message, that the UE failed to receive the downlink message, and that the UE successfully performed the operation.

Some examples of the method, UEs, and non-transitory computer-readable medium described herein may further include operations, features, means, or instructions for receiving an indication of whether the UE may be to perform the operation instructed by the command information if the UE successfully decodes the control message and if the UE fails to decode the downlink message scheduled by the control message.

Some examples of the method, UEs, and non-transitory computer-readable medium described herein may further include operations, features, means, or instructions for receiving an indication of timing information associated with a time at which the UE may be to perform the operation.

In some examples of the method, UEs, and non-transitory computer-readable medium described herein, the scheduling information indicates an absence of the downlink message.

In some examples of the method, UEs, and non-transitory computer-readable medium described herein, the feedback message may be a one-bit message based on the scheduling information indicating the absence of the downlink message.

In some examples of the method, UEs, and non-transitory computer-readable medium described herein, the feedback message may be a two-bit message based on the scheduling information indicating an absence of the downlink message.

Some examples of the method, UEs, and non-transitory computer-readable medium described herein may further include operations, features, means, or instructions for receiving an indication of a downlink assignment index and successfully decoding the control message, where the feedback message may be a one-bit message based on successfully decoding the control message and based on the downlink assignment index being a value of 1.

A method for wireless communications by a network entity is described. The method may include outputting a control message including scheduling information for a downlink message for a UE and command information instructing the UE to perform an operation and obtaining feedback associated with the control message and in accordance with a feedback configuration, the feedback indicating whether the UE successfully decoded the control message, whether the UE successfully received the downlink message, and whether the UE successfully performed the operation.

A network entity for wireless communications is described. The network entity may include one or more memories storing processor executable code, and one or more processors coupled with the one or more memories. The one or more processors may individually or collectively be operable to execute the code to cause the network entity to output a control message including scheduling information for a downlink message for a UE and command information instructing the UE to perform an operation and obtain feedback associated with the control message and in accordance with a feedback configuration, the feedback indicating whether the UE successfully decoded the control message, whether the UE successfully received the downlink message, and whether the UE successfully performed the operation.

Another network entity for wireless communications is described. The network entity may include means for outputting a control message including scheduling information for a downlink message for a UE and command information instructing the UE to perform an operation and means for obtaining feedback associated with the control message and in accordance with a feedback configuration, the feedback indicating whether the UE successfully decoded the control message, whether the UE successfully received the downlink message, and whether the UE successfully performed the operation.

A non-transitory computer-readable medium storing code for wireless communications is described. The code may include instructions executable by one or more processors to output a control message including scheduling information for a downlink message for a UE and command information instructing the UE to perform an operation and obtain feedback associated with the control message and in accordance with a feedback configuration, the feedback indicating whether the UE successfully decoded the control message, whether the UE successfully received the downlink message, and whether the UE successfully performed the operation.

In some examples of the method, network entities, and non-transitory computer-readable medium described herein, outputting the control message may include operations, features, means, or instructions for outputting, in the control message, the command information instructing the UE to switch from a first BWP to a second BWP, from a first SCell dormancy state to a second SCell dormancy state, from a first TCI state to a second TCI state, from a first SSSG to a second SSSG, from a first minimum scheduling offset to a second minimum scheduling offset, or a combination thereof.

Some examples of the method, network entities, and non-transitory computer-readable medium described herein may further include operations, features, means, or instructions for outputting an indication of the feedback configuration via an RRC message or a MAC-CE.

In some examples of the method, network entities, and non-transitory computer-readable medium described herein, outputting the control message may include operations, features, means, or instructions for outputting the control message in accordance with a subcodebook of a set of multiple subcodebooks, where each subcodebook of the set of multiple subcodebooks may be associated with a respective DCI format, and where the feedback may be a 2-bit message based on the subcodebook may be associated with a two-bit DCI format.

In some examples of the method, network entities, and non-transitory computer-readable medium described herein, outputting the control message may include operations, features, means, or instructions for outputting, in the control message, a BWP indicator, an SCell dormancy indication, a TCI state indication, a minimum scheduling offset indicator, or a combination thereof.

In some examples of the method, network entities, and non-transitory computer-readable medium described herein, obtaining the feedback may include operations, features, means, or instructions for obtaining feedback indicating that the UE successfully decoded the control message, that the UE failed to receive the downlink message, and that the UE successfully performed the operation.

Some examples of the method, network entities, and non-transitory computer-readable medium described herein may further include operations, features, means, or instructions for outputting an indication of whether the UE may be to perform the operation instructed by the command information if the UE successfully decodes the control message and if the UE fails to decode the downlink message scheduled by the control message.

Some examples of the method, network entities, and non-transitory computer-readable medium described herein may further include operations, features, means, or instructions for outputting an indication of timing information associated with a time at which the UE may be to perform the operation.

In some examples of the method, network entities, and non-transitory computer-readable medium described herein, the scheduling information indicates an absence of the downlink message.

In some examples of the method, network entities, and non-transitory computer-readable medium described herein, the feedback may be a one-bit message based on the scheduling information indicating the absence of the downlink message.

In some examples of the method, network entities, and non-transitory computer-readable medium described herein, the feedback may be a two-bit message based on the scheduling information indicating an absence of the downlink message.

Some examples of the method, network entities, and non-transitory computer-readable medium described herein may further include operations, features, means, or instructions for outputting an indication of a downlink assignment index, where the feedback may be a one-bit message based on the feedback indicating that the UE successfully decoded the control message and based on the downlink assignment index being a value of 1.

Details of one or more implementations of the subject matter described in this disclosure are set forth in the accompanying drawings and the description below. Other features, aspects, and advantages will become apparent from the description, the drawings, and the claims. Note that the relative dimensions of the following figures may not be drawn to scale.

DETAILED DESCRIPTION

Figure 1:
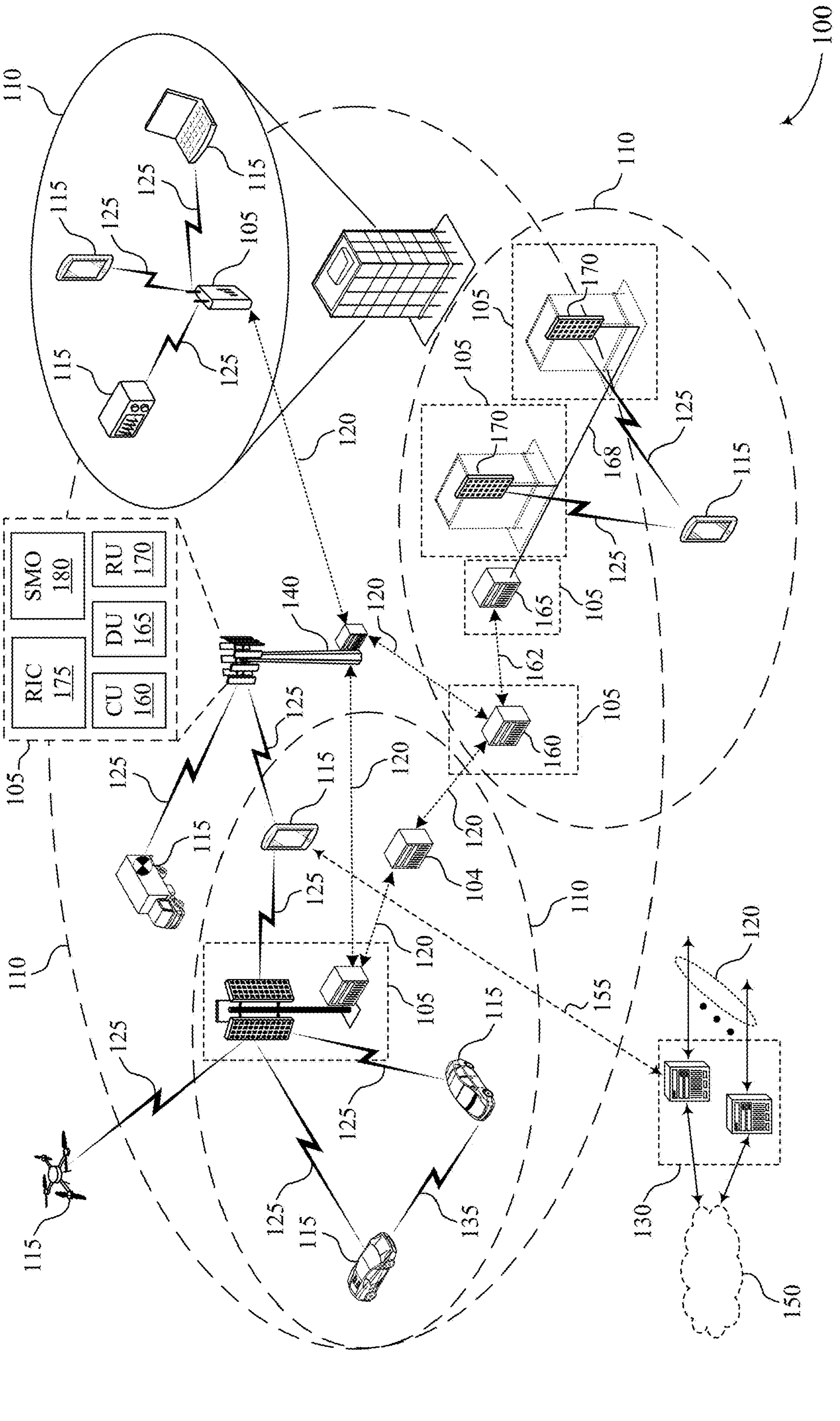
FIG. 1 shows an example of a wireless communications system that supports enhanced control format feedback in accordance with one or more aspects of the present disclosure.

A network entity may transmit a control message (e.g., downlink control information (DCI), physical downlink control channel (PDCCH)) to a user equipment (UE). The DCI may schedule a downlink message (e.g., physical downlink shared channel (PDSCH)). In some cases, the DCI may include command information instructing the UE to perform an operation (e.g., to switch from a first bandwidth part (BWP) to a second BWP, from a first secondary cell (SCell) dormancy state to a second SCell dormancy state, from a first transmission configuration indication (TCI) state to a second TCI state, from a first search space set group (SSSG) to a second SSSG, from a first minimum scheduling offset to a second minimum scheduling offset, or a combination thereof). The UE may report feedback to the network entity in response to the control message (e.g., an acknowledgment (ACK) or negative ACK (NACK)). However, when the UE reports a NACK associated with the control message, it may be ambiguous whether the UE failed to decode the control message or whether the UE successfully decoded the control message but failed to decode the downlink message scheduled by the control message. There may also be ambiguity regarding whether the UE performs or performed the operation when the UE reports a NACK. Techniques for clarifying feedback and improving coordination between devices may be help prevent ambiguity.

In some implementations, the UE may monitor for a control message that includes scheduling information (e.g., for a downlink message for the UE) and command information instructing the UE to perform an operation. For example, the operation may include a switch from a first mode (e.g., a first active BWP, a first SCell dormancy state), a first TCI state, a first SSSG, a first minimum scheduling offset, or a combination thereof) to a second mode (e.g., a second BWP, a second SCell dormancy state, a second TCI state, a second SSSG, a second minimum scheduling offset, or a combination thereof). The UE may generate and transmit feedback associated with the control message, where the feedback indicates whether the UE successfully decoded the control message, whether the UE successfully received the downlink message, and whether the UE successfully performed the operation. If the feedback indicates that the UE failed to decode the control message, the UE may maintain one or more current UE operations (e.g., refrain from performing the operation, stay in the first mode). In some examples, the feedback may indicate that the UE successfully decoded the control message, that the UE failed to receive the downlink message, and that the UE successfully performed the operation. In some examples, the UE may receive an indication of whether the UE is to perform the operation instructed by the command information if the UE successfully decodes the control message and the UE fails to decode the downlink message scheduled by the control message.

Particular aspects of the subject matter described herein may be implemented to realize one or more potential advantages. The described techniques may provide for improved coordination between devices in a wireless communications system, reduced power consumption, improved communication reliability, longer battery life, and reduced ambiguity about a current operating mode of the UE and whether scheduling information was successfully received by the UE. For example, the UE may refrain from performing unnecessary data communication with a dormant SCell. In another example, the UE and the network entity may communicate via abeam (e.g., a beam associated with measurements above a threshold) when the UE switches to a second BWP in accordance with one or more aspects of the present disclosure. In another example, the network entity may refrain from transmitting, and the UE may refrain from monitoring, at a time associated with a minimum scheduling offset, which may reduce power consumption during periods of low traffic.

Aspects of the disclosure are initially described in the context of wireless communications systems. Aspects of the disclosure are then described in the context of a signaling diagram, a timing diagram, and a process flow. Aspects of the disclosure are further illustrated by and described with reference to apparatus diagrams, system diagrams, and flowcharts that relate to enhanced control format feedback.

FIG. 1 shows an example of a wireless communications system 100 that supports enhanced control format feedback in accordance with one or more aspects of the present disclosure. The wireless communications system 100 may include one or more devices, such as one or more network devices (e.g., network entities 105), one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via communication link(s) 125 (e.g., a radio frequency (RF) access link). For example, a network entity 105 may support a coverage area 110 (e.g., a geographic coverage area) over which the UEs 115 and the network entity 105 may establish the communication link(s) 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices in the wireless communications system 100 (e.g., other wireless communication devices, including UEs 115 or network entities 105), as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with a core network 130, or with one another, or both. For example, network entities 105 may communicate with the core network 130 via backhaul communication link(s) 120 (e.g., in accordance with an S1, N2, N3, or other interface protocol). In some examples, network entities 105 may communicate with one another via backhaul communication link(s) 120 (e.g., in accordance with an X2, Xn, or other interface protocol) either directly (e.g., directly between network entities 105) or indirectly (e.g., via the core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication link(s) 120, midhaul communication links 162, or fronthaul communication links 168 may be or include one or more wired links (e.g., an electrical link, an optical fiber link) or one or more wireless links (e.g., a radio link, a wireless optical link), among other examples or various combinations thereof. A UE 115 may communicate with the core network 130 via a communication link 155.

One or more of the network entities 105 or network equipment described herein may include or may be referred to as a base station 140 (e.g., a base transceiver station, a radio base station, an NR base station, an access point, a radio transceiver, a NodeB, an eNodeB (eNB), a next-generation NodeB or giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within one network entity (e.g., a network entity 105 or a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among multiple network entities (e.g., network entities 105), such as an integrated access and backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU), such as a CU 160, a distributed unit (DU), such as a DU 165, a radio unit (RU), such as an RU 170, a RAN Intelligent Controller (RIC), such as an RIC 175 (e.g., a Near-Real Time RIC (Near-RT RIC), a Non-Real Time RIC (Non-RT RIC)), a Service Management and Orchestration (SMO) system, such as an SMO system 180, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more of the network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, or any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaptation protocol (SDAP), Packet Data Convergence Protocol (PDCP)). The CU 160 (e.g., one or more CUs) may be connected to a DU 165 (e.g., one or more DUs) or an RU 170 (e.g., one or more RUs), or some combination thereof, and the DUs 165, RUs 170, or both may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or multiple different RUs, such as an RU 170). In some cases, a functional split between a CU 160 and a DU 165 or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to a DU 165 via a midhaul communication link 162 (e.g., F1, F1-c, F1-u), and a DU 165 may be connected to an RU 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities (e.g., one or more of the network entities 105) that are in communication via such communication links.

In some wireless communications systems (e.g., the wireless communications system 100), infrastructure and spectral resources for radio access may support wireless backhaul link capabilities to supplement wired backhaul connections, providing an IAB network architecture (e.g., to a core network 130). In some cases, in an IAB network, one or more of the network entities 105 (e.g., network entities 105 or IAB node(s) 104) may be partially controlled by each other. The IAB node(s) 104 may be referred to as a donor entity or an IAB donor. A DU 165 or an RU 170 may be partially controlled by a CU 160 associated with a network entity 105 or base station 140 (such as a donor network entity or a donor base station). The one or more donor entities (e.g., IAB donors) may be in communication with one or more additional devices (e.g., IAB node(s) 104) via supported access and backhaul links (e.g., backhaul communication link(s) 120). IAB node(s) 104 may include an IAB mobile termination (IAB-MT) controlled (e.g., scheduled) by one or more DUs (e.g., DUs 165) of a coupled IAB donor. An IAB-MT may be equipped with an independent set of antennas for relay of communications with UEs 115 or may share the same antennas (e.g., of an RU 170) of IAB node(s) 104 used for access via the DU 165 of the IAB node(s) 104 (e.g., referred to as virtual IAB-MT (vIAB-MT)). In some examples, the IAB node(s) 104 may include one or more DUs (e.g., DUs 165) that support communication links with additional entities (e.g., IAB node(s) 104, UEs 115) within the relay chain or configuration of the access network (e.g., downstream). In such cases, one or more components of the disaggregated RAN architecture (e.g., the IAB node(s) 104 or components of the IAB node(s) 104) may be configured to operate according to the techniques described herein.

In the case of the techniques described herein applied in the context of a disaggregated RAN architecture, one or more components of the disaggregated RAN architecture may be configured to support test as described herein. For example, some operations described as being performed by a UE 115 or a network entity 105 (e.g., a base station 140) may additionally, or alternatively, be performed by one or more components of the disaggregated RAN architecture (e.g., components such as an IAB node, a DU 165, a CU 160, an RU 170, an RIC 175, an SMO system 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, vehicles, or meters, among other examples.

The UEs 115 described herein may be able to communicate with various types of devices, such as UEs 115 that may sometimes operate as relays, as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via the communication link(s) 125 (e.g., one or more access links) using resources associated with one or more carriers. The term "carrier" may refer to a set of RF spectrum resources having a defined PHY layer structure for supporting the communication link(s) 125. For example, a carrier used for the communication link(s) 125 may include a portion of an RF spectrum band (e.g., a BWP) that is operated according to one or more PHY layer channels for a given RAT (e.g., LTE, LTE-A, LTE-A Pro, NR). Each PHY layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities, such as one or more of the network entities 105).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max}\cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems, such as the wireless communications system 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (STTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to UEs 115 (e.g., one or more UEs) or may include UE-specific search space sets for sending control information to a UE 115 (e.g., a specific UE).

In some examples, a network entity 105 (e.g., a base station 140, an RU 170) may be movable and therefore provide communication coverage for a moving coverage area, such as the coverage area 110. In some examples, coverage areas 110 (e.g., different coverage areas) associated with different technologies may overlap, but the coverage areas 110 (e.g., different coverage areas) may be supported by the same network entity (e.g., a network entity 105). In some other examples, overlapping coverage areas, such as a coverage area 110, associated with different technologies may be supported by different network entities (e.g., the network entities 105). The wireless communications system 100 may include, for example, a heterogeneous network in which different types of the network entities 105 support communications for coverage areas 110 (e.g., different coverage areas) using the same or different RATs.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 may include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs (e.g., one or more of the UEs 115) via a device-to-device (D2D) communication link, such as a D2D communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1: M) system in which each UE 115 transmits to one or more of the UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than one hundred kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) RAT, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., the communication link(s) 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in relatively poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

A network entity 105 may transmit a control message (e.g., DCI, PDCCH) via communication link(s) 125 to a UE 115 that may schedule a downlink message (e.g., PDSCH) and may include command information instructing the UE 115 to perform an operation (e.g., to switch from a first BWP to a second BWP, from a first SCell dormancy state to a second SCell dormancy state, from a first TCI state to a second TCI state, from a first SSSG to a second SSSG, from a first minimum scheduling offset to a second minimum scheduling offset, or a combination thereof). The UE 115 may report feedback to the network entity 105 in response to monitoring for the control message (e.g., an ACK or NACK). However, when the UE 115 reports a NACK associated with the control message, it may be ambiguous whether the UE 115 failed to decode the control message or whether the UE 115 successfully decoded the control message but failed to decode the downlink message scheduled by the control message. There may also be ambiguity regarding whether the UE 115 performs the operation when the UE 115 reports a NACK for the control message. Methods for clarifying feedback and improving coordination between devices may be desired.

In some implementations, the UE 115 may monitor for a control message (e.g., from a network entity 105 via communication link(s) 125) including scheduling information for a downlink message for the UE 115 and including command information instructing the UE 115 to perform an operation. The operation may include a switch from a first mode (e.g., a first active BWP, a first SCell dormancy state, a first TCI state, a first SSSG, a first minimum scheduling offset, or a combination thereof) to a second mode (e.g., a second BWP, a second SCell dormancy state, a second TCI state, a second SSSG, a second minimum scheduling offset, or a combination thereof). The UE 115 may generate and transmit (e.g., to the network entity 105) feedback associated with the control message, where the feedback indicates whether the UE 115 successfully decoded the control message, whether the UE 115 successfully received the downlink message, and whether the UE 115 successfully performed the operation. If the feedback indicates that the UE 115 failed to decode the control message, the UE 115 may maintain one or more current UE operations (e.g., refrain from performing the operation, stay in the first mode). In some examples, the feedback may indicate that the UE 115 successfully decoded the control message, that the UE 115 failed to receive the downlink message, and that the UE 115 successfully performed the operation. In some examples, the UE 115 may receive an indication of whether the UE 115 is to perform the operation instructed by the command information if the UE 115 successfully decodes the control message and the UE 115 fails to decode the downlink message scheduled by the control message.

Figure 2:
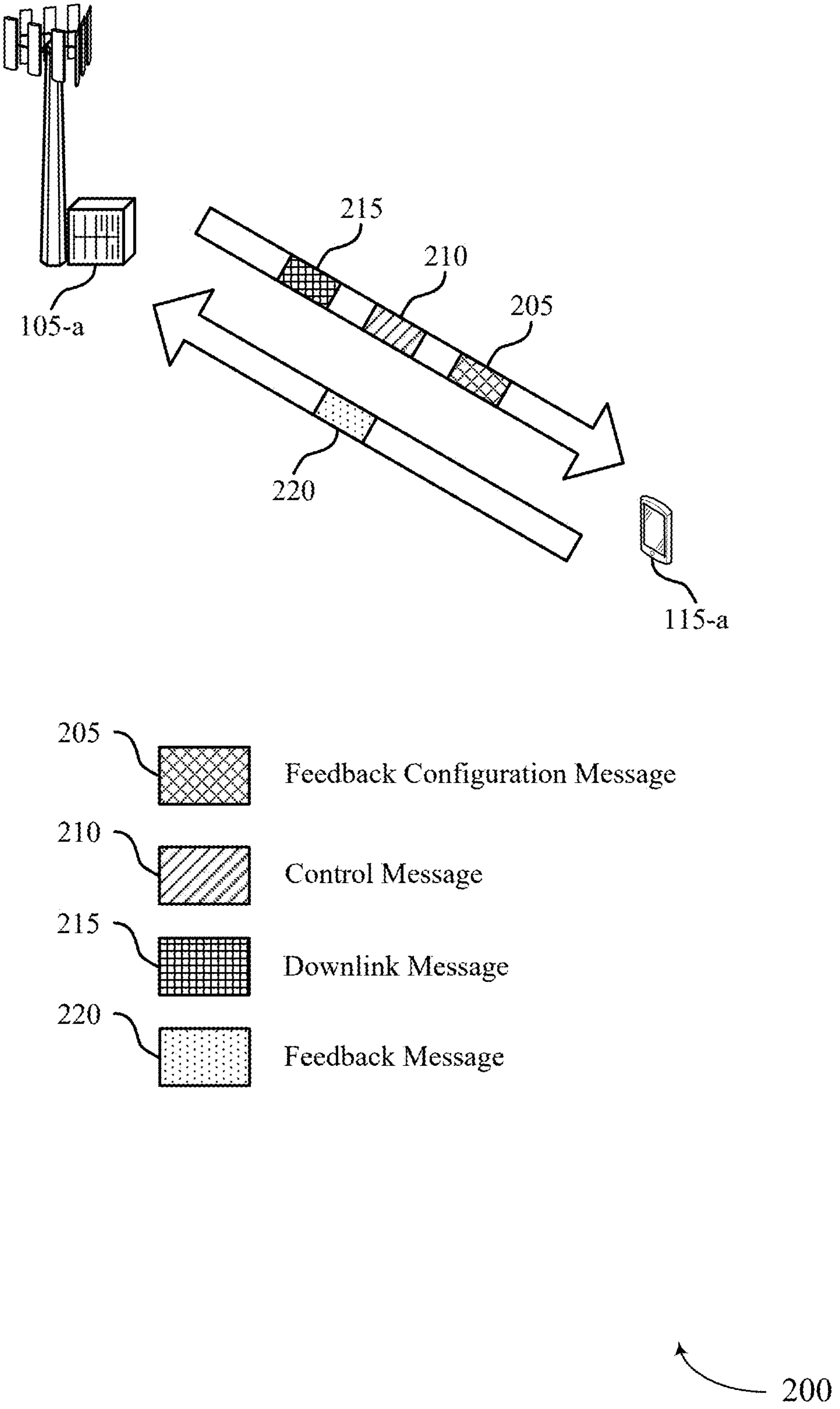
FIG. 2 shows an example of a signaling diagram that supports enhanced control format feedback in accordance with one or more aspects of the present disclosure.

FIG. 2 shows an example of a signaling diagram 200 that supports enhanced control format feedback in accordance with one or more aspects of the present disclosure. In some examples, the signaling diagram 200 may implement aspects of the wireless communications system 100. For example, the signaling diagram 200 includes a UE 115-*a* and a network entity 105-*a*, which may be examples of the corresponding devices described with reference to FIG. 1. Additionally, or alternatively, the UE 115-*a* and the network entity 105-*a* may each be examples of other types of wireless devices, such as an IAB node or another type of transmitter or receiver. Thus, although aspects of the present disclosure are described with reference to a UE 115 and a network entity 105, it is understood that the described techniques may be performed by a wireless device different from a UE 115 and a network entity 105. As described herein, operations performed by the UE 115-*a* and the network entity 105-*a* may be respectively performed by a UE 115, a network entity 105, or another wireless device, and the examples shown should not be construed as limiting.

In wireless communications, a scheduling DCI (e.g., format 1-1) for PDSCH transmission may include not only the scheduling information (such as time and frequency domain resource allocation, a modulation and coding scheme (MCS), or the like), but also additional commands that trigger UE operation to switch between different modes. That is, the network entity 105-*a* may transmit, and the UE 115-*a* may receive, a control message 210 that includes scheduling information for a downlink message 215 and includes command information instructing the UE 115-*a* to perform an operation (e.g., switch from a first mode to a second mode). The additional commands may include dynamically adjustable power saving and BWP operations.

For such a DCI (e.g., the control message 210), when the UE 115-*a* reports a NACK to the network entity 105-*a* (e.g., a gNB), it may be ambiguous which of the following cases has occurred. In a first case, the scheduling DCI is not successfully decoded (e.g., the UE 115-*a* may not successfully decode the control message 210). In a second case, the scheduling DCI is decoded, but the scheduled PDSCH is not successfully decoded (e.g., the UE may successfully decode the control message 210 but may not successfully decode the downlink message 215 scheduled by the control message 210).

Note that there may also be non-scheduling DCI versions of the additional commands (e.g., the control message 210 may include the command information instructing the UE 115-*a* to perform the operation, but the control message 210 may not schedule the downlink message 215). That is, the DCI may not schedule data but only provides the commands. Because it is important for the UE 115-*a* and the network entity 105-*a* (e.g., the gNB) to be aligned, the UE 115-*a* would transmit an ACK or NACK to indicate whether the DCI containing the commands has been successfully received. That is, even though the control message 210 did not schedule the downlink message 215, the UE 115-*a* may still transmit feedback (e.g., an ACK or NACK) associated with receiving the command information in the control message 210. For example, the DCI format may indicate a semi-persistent scheduling (SPS) PDSCH reception, or SCell dormancy without scheduling a PDSCH reception, or indicate a TCI state update without scheduling PDSCH reception. Such a DCI format may be referred to as a DCI format having associated HARQ-ACK information without scheduling a PDSCH reception. In some implementations (e.g., in 6G and beyond), for this kind of scheduling DCI with additional critical commands, the UE 115-*a* may send a HARQ-ACK report indicating the exact failure if either the PDCCH or the scheduled PDSCH is not decoded. That is, the UE 115-*a* may transmit, to the network entity 105-*a*, a feedback message 220 indicating whether the UE 115-*a* successfully decoded the control message 210, whether the UE 115-*a* successfully received the downlink message 215, and whether the UE 115-*a* successfully performed the operation associated with the control message 210.

There are several use cases in which ambiguity regarding feedback associated with the control message 210 may present problems. For example, in a first use case, a simple NACK response may result in ambiguity of a BWP switch indication in PDCCH (e.g., the control message 210). The network entity 105-*a* may use a BWP indication (e.g., in the control message 210) to indicate the next active BWP where the scheduled PDSCH (e.g., the downlink message 215) is scheduled. For example, the UE 115-*a* may be monitoring the PDCCH (e.g., for the control message 210) in a narrow bandwidth for power saving and may switch to a wider bandwidth to quickly receive the PDSCH (e.g., the downlink message 215). In some designs, the UE 115-*a* may switch back to the narrow bandwidth for downlink reception, and the UE 115-*a* may make a new data transmission in the narrow bandwidth while the PDCCH is monitored in the wide bandwidth. Another use case for a BWP switch (e.g., another example in which the control message 210 may include command information instructing the UE 115-*a* to switch from a first BWP to a second BWP) is to tune to the optimal beam for PDCCH monitoring. The PDCCH beam may be associated with a CORESET which is configured within the BWP. By switching to the BWP with the optimal beam for PDCCH in the mobile channel, the UE 115-*a* may optimize the PDCCH monitoring performance. When the UE 115-*a* reports a NACK (e.g., meaning PDCCH ACK and PDSCH NACK, or indicating that the UE 115-*a* successfully decoded the control message 210 but did not successfully decode the downlink message 215) for the scheduling DCI carrying the BWP indication, it may be unclear whether the UE 115-*a* would stay in the old BWP (e.g., first BWP) or switch to the next BWP (e.g., the second BWP, the BWP indicated by the control message 210).

In a second use case, a simple NACK response may result in ambiguity of an SCell dormancy indication in PDCCH (e.g., the control message 210). The network entity 105-*a* may use an SCell dormancy indication to indicate that one or more of multiple configured groups of SCells are dormant. When an SCell is dormant, the UE 115-*a* may not perform data communication with the network entity 105-*a* and may expect for channel state information (CSI) measurement in large periodicities. Otherwise (e.g., when an SCell is not dormant, or is active), the UE 115-*a* may perform normal operations including data communication with the network entity 105-*a*. The SCell dormancy indication may be carried by scheduling DCI (e.g., the control message 210) in a PDCCH transmitted in the primary cell (PCell). When the UE 115-*a* reports a NACK (e.g., meaning PDCCH ACK and PDSCH NACK, or indicating that the UE 115-*a* successfully decoded the control message 210 but did not successfully decode the downlink message 215) for the scheduling DCI carrying the SCell dormancy indication, it may be unclear whether the UE 115-*a* would switch the dormant states of the SCells or stay with old states.

In a third use case, a simple NACK response may result in ambiguity of a TCI state indication in PDCCH (e.g., the control message 210). The TCI state indication may indicate the UE 115-*a* to a new downlink beam to receive the PDSCH (e.g., the downlink message 215). In mobile channels, this is for the UE 115-*a* to track the best beam for optimal downlink throughput. It may take time which is up to UE capability (e.g., a length of time based on a capability of the UE 115-*a*) for the UE 115-*a* to switch to the new beam indicated by the TCI state indication in the control message 210. The beam may be associated with a synchronization signal block (SSB) or CSI-reference signal (CSI-RS) as the quasi-colocation (QCL) source. Normally, the SSB beam is wider with better coverage, and CSI-RS is narrower and is better oriented to the UE 115-*a*. When UE 115-*a* reports a NACK (e.g., meaning PDCCH ACK and PDSCH NACK, or indicating that the UE 115-*a* successfully decoded the control message 210 but did not successfully decode the downlink message 215) for the scheduling DCI carrying the TCI state indication, it may be unclear whether the UE 115-*a* would switch to the target beam or continue to use the old beam.

In a fourth use case, a simple NACK response may result in ambiguity of a minimum scheduling offset indication in PDCCH (e.g., the control message 210). The minimum scheduling offset may enable the UE 115-*a* to sleep between PDCCH (e.g., the control message 210) and PDSCH (e.g., the downlink message 215) decoding. When the UE 115-*a* knows the minimum scheduling offset, it can perform offline PDCCH decoding while the other modules of the receiver (e.g., baseband if it is micro-sleep) are deactivated, and the UE 115-*a* may only capture downlink samples if the UE 115-*a* knows there is a PDSCH. This may save the UE 115-*a* overall power consumption if the traffic is not highly delay critical. When the UE 115-*a* reports a NACK (e.g., meaning PDCCH ACK and PDSCH NACK, or indicating that the UE 115-*a* successfully decoded the control message 210 but did not successfully decode the downlink message 215) for the scheduling DCI carrying the minimum scheduling offset indication, it may be unclear which value the UE 115-*a* should assume for receiving dynamically scheduled PDSCHs.

For a scheduling DCI format that includes both PDSCH scheduling and additional commands, a UE HARQ-ACK report may indicate which of the following cases applies. In some examples, the network entity 105-*a* may transmit, to the UE 115-*a*, an indication of a downlink assignment index (DAI) to prevent ACK/NACK reporting errors due to a HARQ ACK/NACK bundling procedure performed by the UE 115-*a*. In a first case, the UE 115-*a* failed in PDCCH decoding (e.g., a DAI hole corresponds to a missing DCI). In a second case, the UE 115-*a* successfully decoded the PDCCH but failed in PDSCH decoding. In a third case, the UE successfully decoded the PDSCH. That is, the UE 115-*a* may monitor for and receive the control message 210 including scheduling information for the downlink message 215 and including command information instructing the UE 115-*a* to perform an operation. The UE 115-*a* may generate feedback associated with the control message 210 based on the monitoring. The feedback may indicate whether the UE 115-*a* successfully decoded the control message 210, whether the UE 115-*a* successfully received the downlink message 215, and whether the UE 115-*a* successfully performed the operation. The UE 115-*a* may transmit, to the network entity 105-*a*, the feedback message 220 including the generated feedback in accordance with a feedback configuration (e.g., included in a feedback configuration message 205 transmitted by the network entity 105-*a* and received by the UE 115-*a*). The additional commands (e.g., the command information in the control message 210 instructing the UE 115-*a* to perform an operation) may include triggering the UE 115-*a* operation to switch between different modes (e.g., a BWP switch, a TCI state switch, an SSSG switch, a minimum scheduling offset switch, or another mode switch or state switch). The first case, the second case, and the third case are described in more detail with reference to FIG. 3.

The DCI format that is acknowledged by the new HARQ-ACK (e.g., the feedback message 220) may be configured or reconfigured by RRC or medium access control-control element (MAC-CE). For example, the network entity 105-*a* may output or transmit, and the UE 115-*a* may receive, the feedback configuration message 205 via an RRC message or via a MAC-CE. The feedback configuration message 205 may configure or reconfigure the DCI format associated with the control message 210. The commands included in the scheduling DCI (e.g., the command information in the control message 210) may be used by the UE 115-*a* to tightly track channel conditions (e.g., an optimal beam) or adapt to the power operation (e.g., bandwidth, carriers).

Two subcodebooks with separate DAI counting processes may be configured (e.g., via the feedback configuration message 205). For example, the first subcodebook may be for DCI scheduling with one or more first DCI formats (2 bits or 3 states per DCI) and the second subcodebook may be for other downlink DCI formats (1 bit or 2 states per DCI, as in legacy), where DAI counting is separate between these two groups. That is, the UE 115-*a* may receive the control message 210 in accordance with the first subcodebook based on the DCI format associated with the control message 210. The feedback message 220 may be a 2-bit message based on the first subcodebook (e.g., based on the control message 210 being received in accordance with the first subcodebook). Because the DCI format disclosed herein may be associated with a feedback message 220 that may indicate at least three bits of information (e.g., whether the UE 115-*a* successfully decoded the control message 210, whether the UE 115-*a* successfully received the downlink message 215, and whether the UE 115-*a* successfully performed the operation), the feedback message 220 may be a 2-bit message. Thus, the feedback message 220 may be a 2-bit message based on the DCI format and based on the subcodebook. If a DCI is missed (e.g., there is a DAI hole in Type2 HARQ-ACK codebook, or the second subcodebook), the UE 115-*a* may not know the format of the missed DCI. Hence the UE 115-*a* may not know if the feedback (e.g., the feedback message 220) should include 1 bit (e.g., 2 states) or 2 bits (e.g., 3 states).

The DCI format may include one or multiple of the following information that may be configured with the new HARQ-ACK (e.g., the feedback message 220). For example, the control message 210 may include a BWP indicator (e.g., for the first use case described herein). Additionally, or alternatively, the control message 210 may include an SCell dormancy indication (e.g., for the second use case described herein). Additionally, or alternatively, the control message 210 may include a TCI state indication (e.g., for the third use case described herein). Additionally, or alternatively, the control message 210 may include a minimum applicable scheduling offset indicator (e.g., for the fourth use case described herein).

If the UE 115-*a* reports that it has failed in PDCCH decoding, the UE 115-*a* may maintain the current configuration including active BWP, SCell dormancy states, TCI state, and minimum scheduling offset. This may be the UE behavior of the first case described herein, in which the UE 115-*a* did not successfully receive and decode the control message 210. With the new HARQ-ACK report, the network could be aligned with the UE's configuration status. For example, the UE 115-*a* may communicate to the network entity 105-*a*, via the feedback message 220, that the UE 115-*a* failed to decode the control message 210, that the UE 115-*a* failed to receive the downlink message 215, and that the UE 115-*a* did not perform the operation instructed by the control message 210 (e.g., the UE 115-*a* maintained a first BWP, a first set of one or more SCell dormancy states, a first TCI state, a first minimum scheduling offset, or a combination thereof rather than switching to a second BWP, a second set of one or more SCell dormancy states, a second TCI state, a second minimum scheduling offset, or a combination thereof).

If the UE 115-*a* reports that it has successfully decoded PDCCH but failed in PDSCH decoding, the UE 115-*a* may execute the command (e.g., switches to the indicated configuration based on the PDCCH including active BWP, SCell dormancy states, TCI state, and minimum scheduling offset). This may be the UE behavior of the second case described herein, in which the UE 115-*a* successfully decoded the control message 210 but failed to decode the downlink message 215. In this case, the feedback message 220 may indicate, to the network entity 105-*a*, that the UE 115-*a* successfully decoded the control message 210, that the UE 115-*a* did not successfully receive the downlink message 215, and that the UE 115-*a* successfully performed the operation. That is the UE 115-*a* may switch from a first BWP to a second BWP, from a first SCell dormancy state to a second SCell dormancy state, from a first TCI state to a second TCI state, from a first SSSG to a second SSSG, from a first minimum scheduling offset to a second minimum scheduling offset, or a combination thereof based on successfully decoding the control message 210, and may indicate, to the network entity 105-*a* via the feedback message 220, that the UE 115-*a* made the switch.

Additionally, or alternatively, the network may configure whether the UE 115-*a* switches to the indicated configuration based on the PDCCH or stays with the old configuration including active BWP, SCell dormancy states, TCI state and minimum scheduling offset if the UE 115-*a* reports it has successfully decoded PDCCH but failed in PDSCH decoding. This is an alternative UE behavior of the second case described herein, where the UE behavior may be configured by the network. For example, the network entity 105-*a* may configure (e.g., via the feedback configuration message 205) the UE 115-*a* to perform the operation indicated by the control message 210 or refrain from performing the operation indicated by the control message 210 in the event that the UE 115-*a* successfully decodes the control message 210 but fails to decode the downlink message 215.

In some examples, (e.g., in 6G and beyond) it may be possible that the scheduling is enhanced so that the network can instruct the UE 115-*a* to switch to the indicated configuration after the UE 115-*a* performs the scheduled PDSCH reception. That is, the network entity 105-*a* may instruct the UE 115-*a*, via the command information in the control message 210, to perform the operation at a time after the UE 115-*a* monitors for the downlink message 215. For example, the network entity 105-*a* may want (e.g., instruct) the UE 115-*a* to first finish the PDSCH reception (e.g., reception of the downlink message 215) in the current active BWP which has a wide bandwidth and then switch to the target BWP (e.g., indicated by the control message 210) which has a narrow bandwidth. In another example, for satellite communications, the network entity 105-*a* may indicate (e.g., via the control message 210) the UE 115-*a* to switch to a target beam after the current scheduled PDSCH (e.g., the downlink message 215) so that the UE 115-*a* will already track the new beam in the future when it prepares to receive the next PDSCH in the new beam. To accommodate these and other cases, the network entity 105-*a* may explicitly configure the UE 115-*a* with the configuration switching time point. For example, the network entity 105-*a* may configure, via the feedback configuration message 205 or the control message 210, the configuration switching time point to the UE 115-*a* associated with an active BWP switch, SCell dormancy states switch, TCI state switch, minimum scheduling offset switch, or a combination thereof. The configuration switching time point may be described in further detail with reference to FIG. 3.

For a DCI that does not schedule PDSCH (e.g., the control message 210 only indicates SCell dormancy, or instructs the UE 115-*a* to perform an operation without scheduling the downlink message 215) but can schedule PDSCH (e.g., the DCI format belongs to a set of DCI formats that are capable of scheduling a downlink message 215), the UE 115-*a* may be configured to use at least one or several options. In a first option, the UE 115-*a* may fallback to using a feedback message 220 that is 1 bit (e.g., 2 states) per DCI. In a second option, the UE 115-*a* may use a fixed case 2 or case 3 (e.g., a feedback message 220 that is 2 bits, or 3 states, per DCI) to maximize the distance between case 1. That is, the UE 115-*a* may transmit a 2-bit feedback message 220 associated with a control message 210 that does not schedule a downlink message 215 to differentiate from a case in which the UE 115-*a* fails to decode the control message 210. In some examples, this second option may be standardized (e.g., rather than configured by the network entity 105-*a*). Case 2 (in which the UE 115-*a* successfully decodes the control message 210, but fails to receive the downlink message 215) and case 3 (in which the UE 115-*a* successfully decodes both the control message 210 and the downlink message 215) may have the same meaning, as there is no PDSCH (e.g., downlink message 215) for this particular DCI (e.g., control message 210). In a third option, the UE 115-*a* may use either case 2 or case 3 up to the implementation of the UE 115-*a*.

For a special case that a physical uplink control channel (PUCCH) includes HARQ-ACK for only one detected DCI/PDSCH and indicated DAI=1, we can fallback to legacy (2 states or single bit). That is, the UE 115-*a* may receive an indication of a DAI (e.g., from the network entity 105-*a*), and the feedback message 220 may be a 1-bit message based on successfully decoding the control message 210 and based on the received DAI being a value of 1. If the network entity 105-*a* (e.g., gNB) indeed transmitted one DCI (e.g., a single control message 210), the fact that UE 115-*a* transmits PUCCH may indicate that the DCI is detected (e.g., discontinuous transmission, or no transmission, may indicate that the DCI is missed). Hence, indication of Case 1 may not be needed. If the network entity 105-*a* transmitted more than one DCI but only one DCI is detected by the UE 115-*a*, and DAI=1 (e.g., the second DCI is missed), the UE 115-*a* may be unaware that a DCI is missing or has been missed. In this case, there may be a codebook size mismatch issue. If the network entity 105-*a* transmitted more than one DCI but only one DCI is detected by the UE 115-*a*, and DAI=2 (e.g., the first DCI is missed), the UE 115-*a* may know that the first DCI is missed and can indicate Case 1 (of 2 bits or 3 states per DCI) via the feedback message 220. However, this is not the case when the feedback message 220 includes feedback for a single control message 210 and a corresponding downlink message 215 with a DAI value of 1, in which case the feedback message 220 may be 2 bits or 3 states per DCI.

The network entity 105-*a* may output, and the UE 115-*a* may receive, the feedback configuration message at a time before transmission of the control message 210. The feedback configuration message may include an indication of a subcodebook (e.g., associated with a DCI format associated with the control message 210 and associated with a size of the feedback message 220), an indication of a DCI format associated with the control message 210, an indication of a format or size of the feedback message 220 (e.g., 1 bit or 2 bits per DCI), an indication of a switching time point at which the UE 115-*a* may switch from a first mode to a second mode indicated by the control message 210, an indication of whether the UE 115-*a* is to switch from the first mode to the second mode based on whether the UE 115-*a* successfully decodes the control message 210 and based on whether the UE 115-*a* successfully receives the downlink message 215, or any combination thereof.

Figure 3:
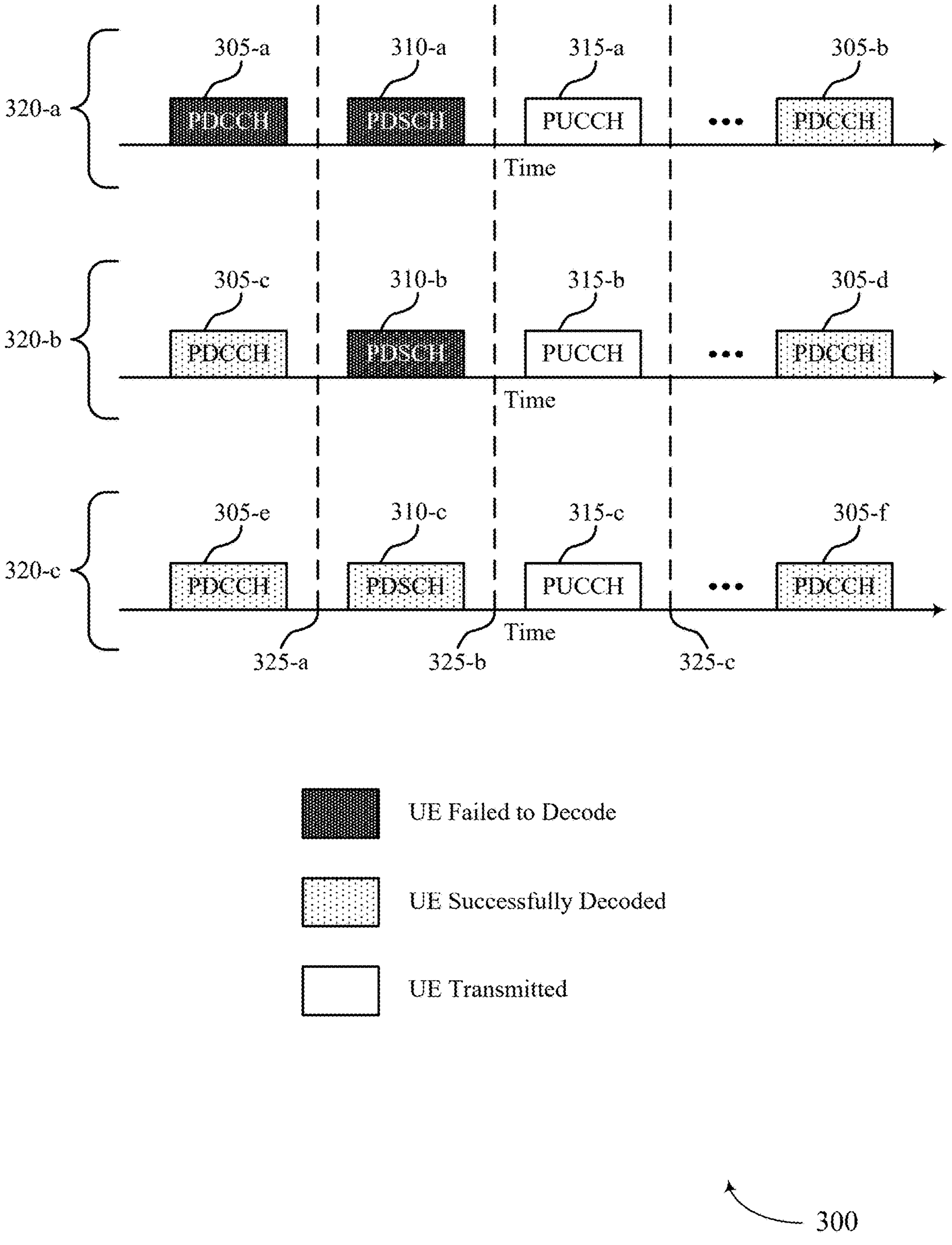
FIG. 3 shows an example of a timing diagram that supports enhanced control format feedback in accordance with one or more aspects of the present disclosure.

FIG. 3 shows an example of a timing diagram 300 that supports enhanced control format feedback in accordance with one or more aspects of the present disclosure. The timing diagram 300 may implement or be implemented by one or more aspects of the wireless communications system 100 and the signaling diagram 200 described with reference to FIGS. 1 and 2, respectively. For example, the timing diagram 300 may be implemented by a network entity 105 and a UE 115 as described with reference to FIGS. 1 and 2 to support an enhanced control format feedback.

For example, the timing diagram 300 may be utilized when the network entity 105 transmits a control message (e.g., a PDCCH 305, a DCI) to the UE 115 including scheduling information for a downlink message (e.g., a PDSCH 310) for the UE and including command information instructing the UE 115 to perform an operation (e.g., a switch from a first mode to a second mode, as described in more detail with reference to FIG. 2). For example, the PDCCH (e.g., a first PDCCH 305-*a*, a third PDCCH 305-*c*, or a fifth PDCCH 305-*e*) may include a BWP indicator, an SCell dormancy indication, a TCI state indication, an SSSG indication, a minimum applicable scheduling offset indicator, or any combination thereof. The UE 115 may transmit a feedback message via a PUCCH 315 that indicates whether the UE 115 successfully decoded the PDCCH 305, whether the UE 115 successfully received the PDSCH 310, and whether the UE 115 successfully performed the operation indicated by the PDCCH 305.

In a first case 320-*a*, the UE 115-*a* may fail to decode the first PDCCH 305-*a* (e.g., a DAI hole may correspond to a missing DCI). Because the first PDCCH 305-*a* included scheduling information for the PDSCH 310-*a*, the UE 115 may also fail to receive the PDSCH 310-*a*. Similarly, because the first PDCCH 305-*a* included command information instructing the UE 115 to perform an operation, the UE 115 may not successfully perform the operation. Instead, the UE 115 may continue to operate in a first mode (e.g., associated with a first BWP, a first SCell dormancy state, a first TCI state, a first SSSG, a first minimum scheduling offset, or a combination thereof), or maintain a current configuration. The UE 115 may transmit feedback via the PUCCH 315-*a* indicating that the UE 115 did not successfully decode the first PDCCH 305-*a*, that the UE 115 did not successfully decode the PDSCH 310-*a*, and that the UE 115 did not successfully perform the operation. The PUCCH 315-*a* (e.g., including a HARQ-ACK report) may align the network entity 105 with the configuration status of the UE 115. In some examples, the UE 115 may monitor for a second PDCCH 305-*b* (e.g., a retransmission of the first PDCCH 305-*a*).

In a second case 320-*b*, the UE 115 may successfully decode the third PDCCH 305-*c* but fail to decode the PDSCH 310-*b*. In some examples, the UE 115 may perform the operation indicated by the third PDCCH 305-*c*, while in other cases the UE 115 may refrain from performing the operation indicated by the third PDCCH 305-*c*. In either case, the UE 115 may transmit feedback, via the PUCCH 315-*b*, indicating that the UE 115 successfully decoded the third PDCCH 305-*c*, indicating that the UE 115 did not successfully receive the PDSCH 310-*b*, and indicating whether the UE 115 performed the operation. In some examples, the UE 115 may monitor for a fourth PDCCH 305-*d* (e.g., scheduling a retransmission of the PDSCH 310-*b*), for a retransmission of the PDSCH 310-*b*, or both.

In one example of the second case 320-*b*, in which the UE 115 reports that is has successfully decoded the third PDCCH 305-*c* but failed in decoding the PDSCH 310-*b*, the UE 115 may execute the command (e.g., switch to the indicated configuration based on the third PDCCH 305-*c* including an active BWP, one or more SCell dormancy states, a TCI state, a minimum scheduling offset, or a combination thereof). That is, the UE 115 may operate in accordance with a first mode (e.g., an old configuration associated with a first BWP, a first set of one or more SCell dormancy states, a first TCI state, a first minimum scheduling offset, or a combination thereof) before a switching time point (e.g., a first switching time point 325-*a*, a second switching time point 325-*b*, or a third switching time point 325-*c*), and may operate in accordance with a second mode (e.g., a new configuration associated with a second BWP, a second set of one or more SCell dormancy states, a second TCI state, a second minimum scheduling offset, or a combination thereof) after the switching time point (e.g., the first switching time point 325-*a*, the second switching time point 325-*b*, or the third switching time point 325-*c*).

In an additional or alternative example of the second case 320-*b*, the network entity 105 may configure whether the UE 115 switches to the indicated configuration based on the third PDCCH 305-*c* or stays with (e.g., maintains) the old configuration including active BWP, SCell dormancy states, TCI state and minimum scheduling offset if the UE 115 reports it has successfully decoded the third PDCCH 305-*c* but failed in decoding the PDSCH 310-*b*. That is, the UE 115 may switch from the first mode (e.g., configuration) to the second mode (e.g., configuration indicated by the third PDCCH 305-*c*) at the first switching time point 325-*a*, the second switching time point 325-*b*, or the third switching time point 325-*c* in accordance with a network configuration (e.g., indicated by the feedback configuration message 205 described with reference to FIG. 2). For example, the fourth PDCCH 305-*d* may be received while the UE 115 is operating in the first mode or the second mode based on the network configuration.

In a third case 320-*c*, the UE 115 may successfully decode the fifth PDCCH 305-*e* and successfully decode the PDSCH 310-*c*. In some examples, the UE 115 may successfully perform the operation indicated by the fifth PDCCH 305-*e*, while in other cases the UE 115 may refrain from performing the operation indicated by the third PDCCH 305-*c*. In either case, the UE 115 may transmit feedback, via the PUCCH 315-*c*, indicating that the UE 115 successfully decoded the fifth PDCCH 305-*e*, indicating that the UE 115 successfully received the PDSCH 310-*c*, and indicating whether the UE 115 performed the operation. In some examples, the UE 115 may monitor for a sixth PDCCH 305-*f*.

In some examples (e.g., in 6G, in any of the first case 320-*a*, the second case 320-*b*, or the third case 320-*c*), the network entity 105 may command the UE 115 (e.g., via the fifth PDCCH 305-*e*) to perform the operation (e.g., to switch from the first mode or current configuration to the second mode or a configuration indicated by the fifth PDCCH 305-*e*) at an indicated time, such as after the UE 115 performs the scheduled reception of the PDSCH 310-*c* (e.g., at the second switching time point 325-*b* rather than at the first switching time point 325-*a*). For example, the network entity 105 may want the UE 115 to first finish the PDSCH 310-*c* reception in the current active BWP which has a wide bandwidth and then switch (e.g., at the second switching time point 325-*b*) to the target BWP which has a narrow bandwidth. In another example, for satellite communications, the network entity 105 may indicate the UE 115 to switch to a target beam after the PDSCH 310-*c* (e.g., at the second switching time point 325-*b*), which is currently scheduled, so that the UE 115 will already track the new beam in the future when it prepares to receive the next PDSCH in the new beam (e.g., after reception of the sixth PDCCH 305-*f*). To accommodate these examples, the network entity 105 may explicitly configure the UE 115 with the configuration switching time point 325. That is, the network entity 105 may configure the configuration switching time point 325 to the UE 115 associated with an active BWP, an SCell dormancy state switch, a TCI state switch, a minimum scheduling offset switch, or any combination thereof. The UE 115 may be configured to switch from the first mode to the second mode at the first switching time point 325-*a* after reception of the fifth PDCCH 305-*e*, at the second switching time point 325-*b* after reception of the PDSCH 310-*c*, or at the third switching time point after transmission of the PUCCH 315-*c* and before reception of the sixth PDCCH 305-*f*.

Figure 4:
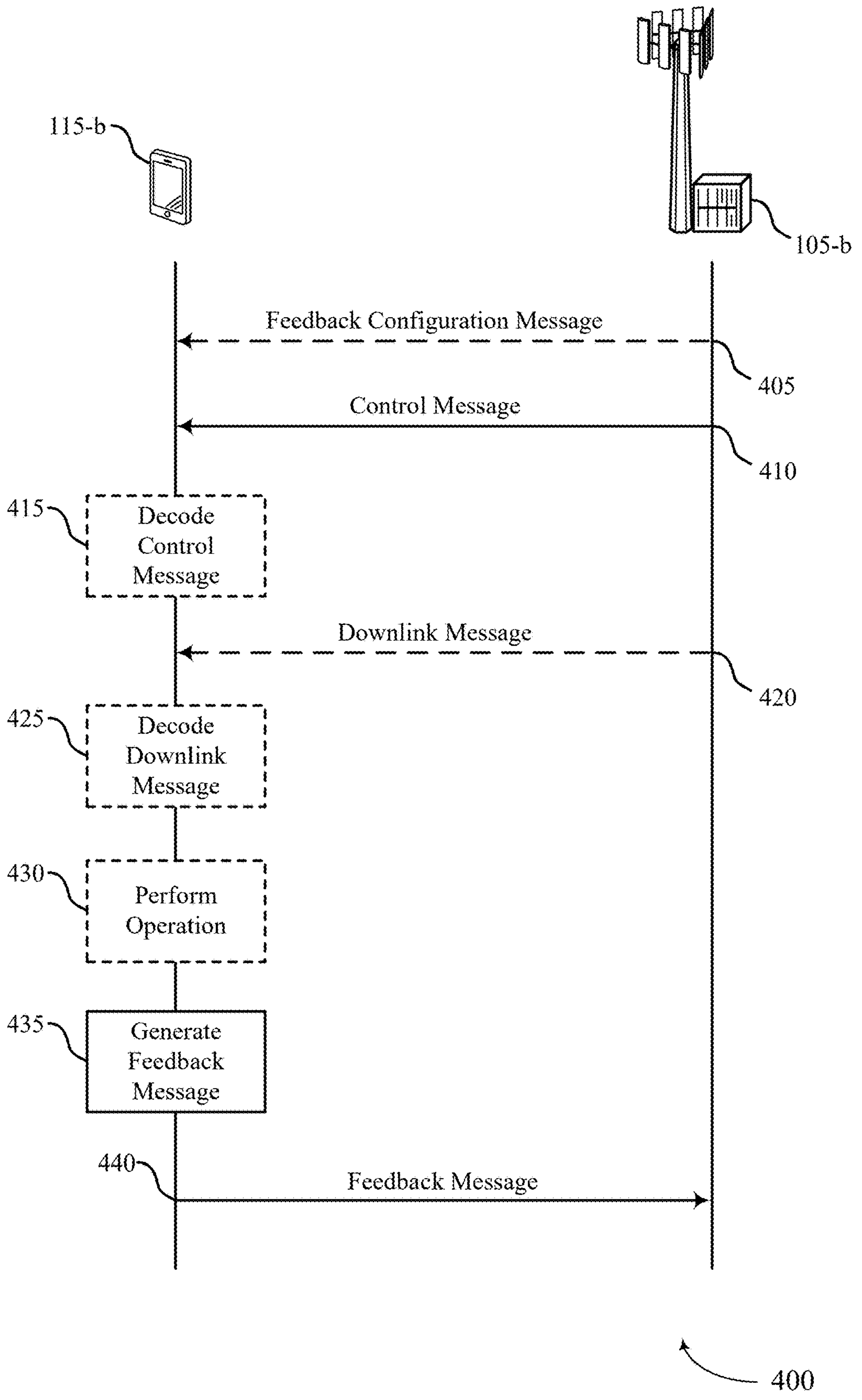
FIG. 4 shows an example of a process flow that supports enhanced control format feedback in accordance with one or more aspects of the present disclosure.

FIG. 4 shows an example of a process flow 400 that supports enhanced control format feedback in accordance with one or more aspects of the present disclosure. In some examples, the process flow 400 may be implemented by, or may implement aspects of, the wireless communications system 100, the signaling diagram 200, and the timing diagram 300. For example, the process flow 400 includes a network entity 105-*b* and a UE 115-*b*, which may be examples of the corresponding devices described with reference to FIGS. 1 and 2. Following the process flow 400, the UE 115-*b* may provide enhanced feedback associated with a control message that schedules a downlink message and instructs the UE 115-*b* to perform an operation, thereby improving coordination between the UE 115-*b* and the network entity 105-*b*. Alternative examples of the following may be implemented, where some steps are performed in a different order than described or are not performed at all. In some cases, steps may include additional features not mentioned below, or further steps may be added. Although the UE 115-*b* and the network entity 105-*b* are shown performing the operations of the process flow 400, some aspects of some operations may also be performed by one or more other wireless devices.

At 405, the network entity 105-*b* may output or transmit, and the UE 115-*b* may receive, an indication of a feedback configuration. For example, the UE 115-*b* may receive the indication of the feedback configuration via an RRC message or via a MAC-CE.

At 410, the network entity 105-*b* may output or transmit, and the UE 115-*b* may monitor for and receive, a control message including scheduling information for a downlink message for the UE 115-*b*. The control message may also include command information instructing the UE 115-*b* to perform an operation. In some examples, the command information in the control message may instruct the UE 115-*b* to switch from a first BWP to a second BWP, from a first SCell dormancy state to a second SCell dormancy state, from a first TCI state to a second TCI state, from a first SSSG to a second SSSG, from a first minimum scheduling offset to a second minimum scheduling offset, or a combination thereof. That is, the operation that the command information may instruct the UE 115-*b* to perform may include switching from a first state to a second state, such as from a first BWP to a second BWP, from a first SCell dormancy state to a second SCell dormancy state, from a first TCI state to a second TCI state, from a first SSSG to a second SSSG, from a first minimum scheduling offset to a second minimum scheduling offset, or a combination thereof. For example, the control message may include a BWP indicator, an SCell dormancy indication, a TCI state indication, a minimum scheduling offset indicator, or a combination thereof. The UE 115-*b* may switch from a first BWP, a first SCell dormancy state, a first TCI state, a first minimum scheduling offset, or a combination thereof to the BWP, SCell dormancy state, TCI state, minimum scheduling offset, or combination thereof indicated by the control message based on the first state being different from the state indicated by the control message.

In some examples, the UE 115-*b* may receive the control message in accordance with a subcodebook of a set of multiple subcodebooks. Each subcodebook of the set of multiple subcodebooks may be associated with a respective DCI format. The UE 115-*b* may generate a 2-bit feedback message at 435 based on the subcodebook (e.g., rather than a 1-bit feedback message). In some examples, the scheduling information may indicate a presence or absence of the downlink message at 420.

At 415, the UE 115-*b* may attempt to decode the control message that the network entity 105-*b* output at 410. In some examples, the UE 115-*b* may fail to decode the control messaged based on monitoring for the control message at 410. The UE 115-*b* may maintain one or more UE operations according to a current BWP indicator, a current SCell dormancy indication, a current TCI state indication, a current scheduling offset indicator, or a combination thereof based on a failure to decode the control message at 415.

At 420, the network entity 105-*b* may output or transmit, and the UE 115-*b* may receive, the downlink message (e.g., a PDSCH message) indicated by the scheduling information in the control message transmitted at 410. In some examples, the scheduling information may indicate an absence of the downlink message, and the network entity 105-*b* may therefore refrain from outputting the downlink message at 420.

At 425, the UE 115-*b* may attempt to decode the downlink message that the network entity 105-*b* output at 420. The UE 115-*b* may not attempt to decode the downlink message if the scheduling information received via the control message at 410 indicated an absence of the downlink message. Whether the UE 115-*b* successfully decodes the downlink message at 425 may affect whether the UE 115-*b* performs the operation at 430 and may affect the contents of the feedback message generated at 435.

At 430, the UE 115-*b* may perform the operation indicated by the control message at 410 (e.g., instructed by the command information included in the control message). In some examples, the UE 115-*b* may receive (e.g., via the feedback configuration, or another message from the network entity 105-*b*) an indication of whether the UE 115-*b* is to perform the operation instructed by the command information if the UE 115-*b* successfully decodes the control message at 415 and if the UE 115-*b* fails to decode the downlink message at 425 scheduled by the control message at 410. In some examples, the UE 115-*b* may receive an indication of timing information associated with a time at which the UE 115-*b* is to perform the operation. The UE 115-*b* may perform the operation at the time indicated by the timing information. For example, the UE 115-*b* may perform the operation at a time after decoding the control message at 415 and before decoding the downlink message at 425, in accordance with the timing information. In another example, the UE 115-*b* may perform the operation after decoding the downlink message at 425 and before transmitting the feedback message at 440 (or a PUCCH message), in accordance with the timing information. In a third example, the UE 115-*b* may perform the operation after transmitting the feedback message at 440 (or a PUCCH message), in accordance with the timing information.

At 435, the UE 115-*b* may generate feedback associated with the control message received at 410 based on monitoring for the control message. The feedback may indicate whether the UE 115-*b* successfully decoded the control message at 415, whether the UE 115-*b* successfully received (e.g., decoded) the downlink message at 425, and whether the UE 115-*b* successfully performed the operation at 430. For example, the UE 115-*b* may generate feedback indicating that the UE 115-*b* successfully decoded the control message at 415, that the UE 115-*b* failed to receive the downlink message at 425, and that the UE 115-*b* successfully performed the operation commanded by the control message received at 410. In some examples, the feedback may be a 2-bit message (e.g., rather than a 1-bit message) based on receiving the control message in accordance with a subcodebook associated with a respective DCI format.

At 440, the UE 115-*b* may transmit, and the network entity may obtain or receive, a feedback message including the feedback generated at 435 in accordance with a feedback configuration (e.g., the feedback configuration received at 405). In some examples, the feedback message may be a one-bit message based on the scheduling information at 410 indicating the absence of the downlink message at 420. In some examples, the feedback message may be a two-bit message based on the scheduling information at 410 indicating the absence of the downlink message at 420. In some examples, the UE 115-*b* may receive an indication of a downlink assignment index, and the feedback message may be a one-bit message based on successfully decoding the control message at 415 and based on the downlink assignment index being a value of 1.

Figure 5:
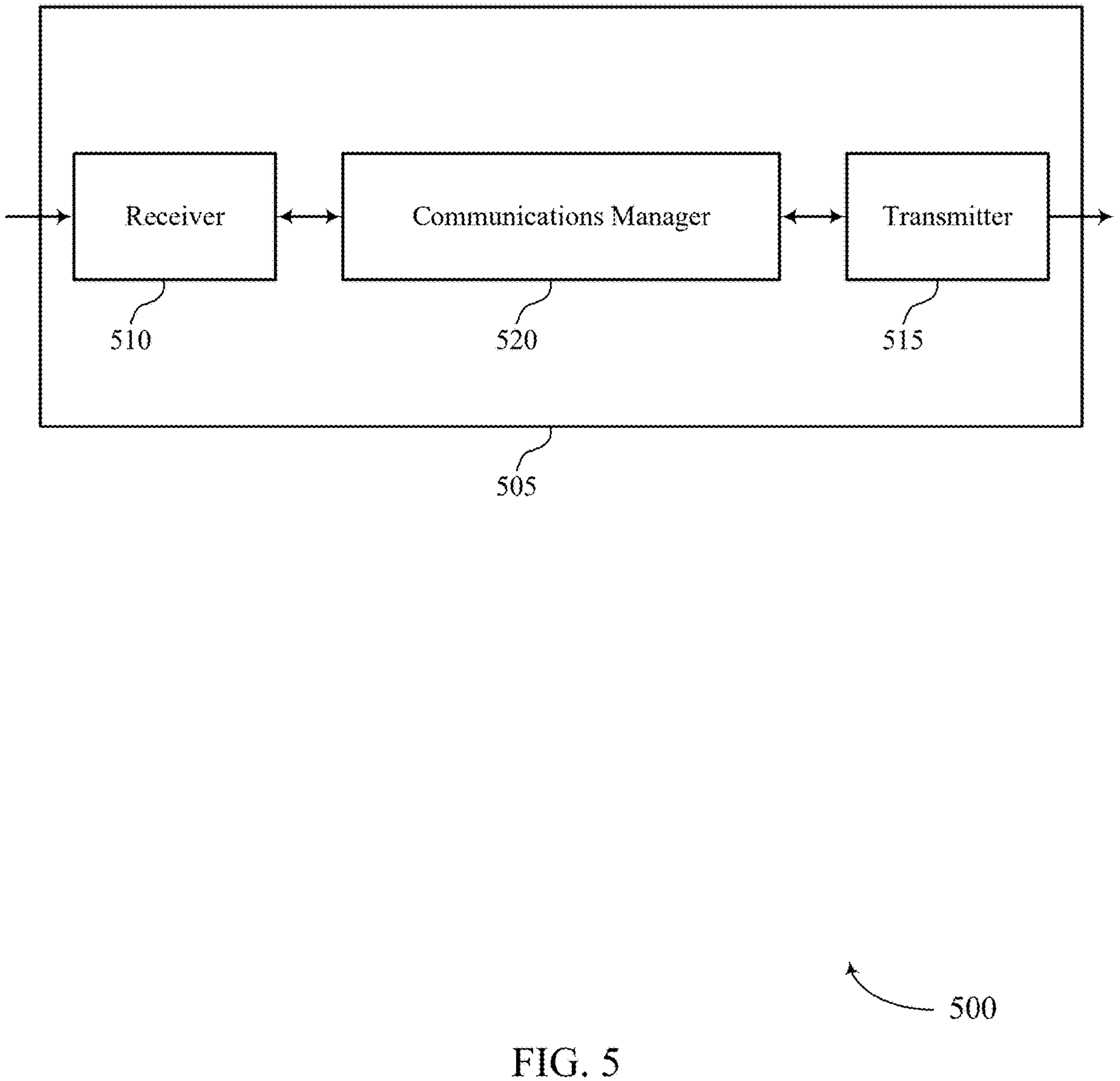
FIGS. 5 and 6 show block diagrams of devices that support enhanced control format feedback in accordance with one or more aspects of the present disclosure.

FIG. 5 shows a block diagram 500 of a device 505 that supports enhanced control format feedback in accordance with one or more aspects of the present disclosure. The device 505 may be an example of aspects of a UE 115 as described herein. The device 505 may include a receiver 510, a transmitter 515, and a communications manager 520. The device 505, or one or more components of the device 505 (e.g., the receiver 510, the transmitter 515, the communications manager 520), may include at least one processor, which may be coupled with at least one memory, to, individually or collectively, support or enable the described techniques. Each of these components may be in communication with one another (e.g., via one or more buses).

The receiver 510 may provide a means for receiving information such as packets, user data, control information, or any combination thereof associated with various information channels (e.g., control channels, data channels, information channels related to enhanced control format feedback). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to enhanced control format feedback). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations or components thereof may be examples of means for performing various aspects of enhanced control format feedback as described herein. For example, the communications manager 520, the receiver 510, the transmitter 515, or various combinations or components thereof may be capable of performing one or more of the functions described herein.

In some examples, the communications manager 520, the receiver 510, the transmitter 515, or various combinations or components thereof may be implemented in hardware (e.g., in communications management circuitry). The hardware may include at least one of a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 520, the receiver 510, the transmitter 515, or various combinations or components thereof may be implemented in code (e.g., as communications management software or firmware) executed by at least one processor (e.g., referred to as a processor-executable code). If implemented in code executed by at least one processor, the functions of the communications manager 520, the receiver 510, the transmitter 515, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 520 may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communications in accordance with examples as disclosed herein. For example, the communications manager 520 is capable of, configured to, or operable to support a means for monitoring for a control message including scheduling information for a downlink message for the UE and including command information instructing the UE to perform an operation. The communications manager 520 is capable of, configured to, or operable to support a means for generating feedback associated with the control message based on the monitoring, the feedback indicating whether the UE successfully decoded the control message, whether the UE successfully received the downlink message, and whether the UE successfully performed the operation. The communications manager 520 is capable of, configured to, or operable to support a means for transmitting a feedback message including the generated feedback in accordance with a feedback configuration.

By including or configuring the communications manager 520 in accordance with examples as described herein, the device 505 (e.g., at least one processor controlling or otherwise coupled with the receiver 510, the transmitter 515, the communications manager 520, or a combination thereof) may support techniques for reduced power consumption and more efficient utilization of communication resources.

Figure 6:
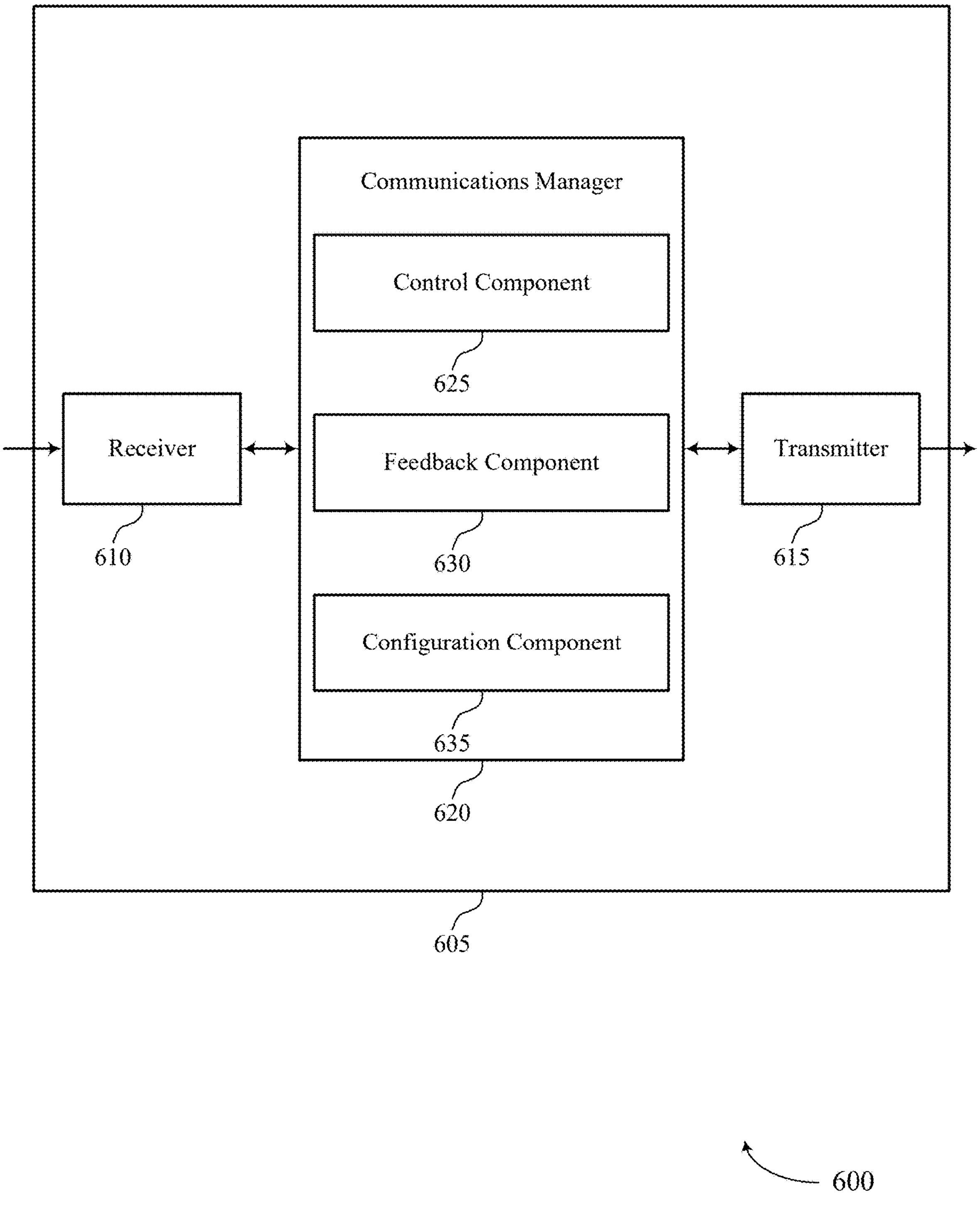

FIG. 6 shows a block diagram 600 of a device 605 that supports enhanced control format feedback in accordance with one or more aspects of the present disclosure. The device 605 may be an example of aspects of a device 505 or a UE 115 as described herein. The device 605 may include a receiver 610, a transmitter 615, and a communications manager 620. The device 605, or one or more components of the device 605 (e.g., the receiver 610, the transmitter 615, the communications manager 620), may include at least one processor, which may be coupled with at least one memory, to support the described techniques. Each of these components may be in communication with one another (e.g., via one or more buses).

The receiver 610 may provide a means for receiving information such as packets, user data, control information, or any combination thereof associated with various information channels (e.g., control channels, data channels, information channels related to enhanced control format feedback). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to enhanced control format feedback). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of enhanced control format feedback as described herein. For example, the communications manager 620 may include a control component 625, a feedback component 630, a configuration component 635, or any combination thereof. The communications manager 620 may be an example of aspects of a communications manager 520 as described herein. In some examples, the communications manager 620, or various components thereof, may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communications in accordance with examples as disclosed herein. The control component 625 is capable of, configured to, or operable to support a means for monitoring for a control message including scheduling information for a downlink message for the UE and including command information instructing the UE to perform an operation. The feedback component 630 is capable of, configured to, or operable to support a means for generating feedback associated with the control message based on the monitoring, the feedback indicating whether the UE successfully decoded the control message, whether the UE successfully received the downlink message, and whether the UE successfully performed the operation. The configuration component 635 is capable of, configured to, or operable to support a means for transmitting a feedback message including the generated feedback in accordance with a feedback configuration.

Figure 7:
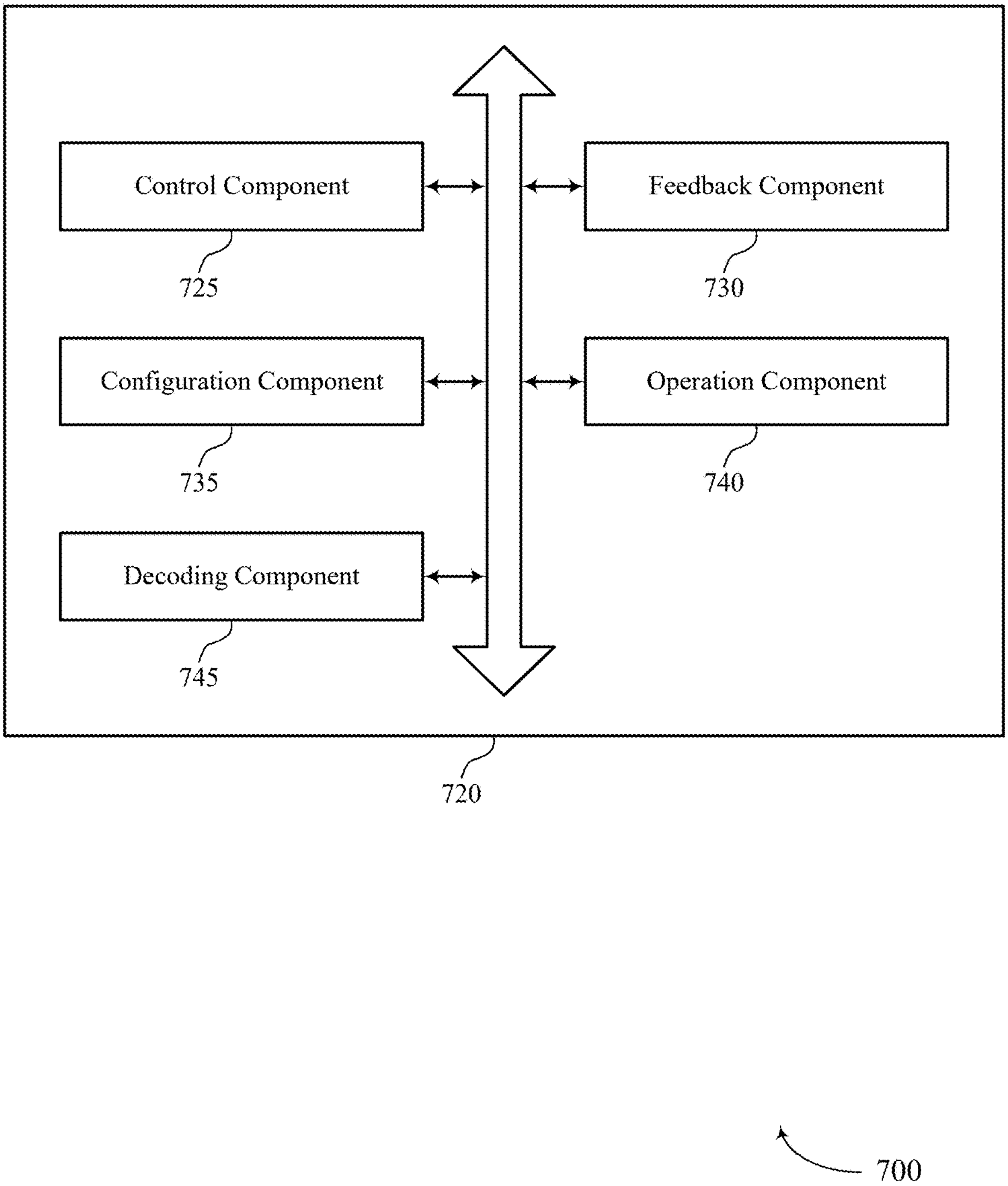
FIG. 7 shows a block diagram of a communications manager that supports enhanced control format feedback in accordance with one or more aspects of the present disclosure.

FIG. 7 shows a block diagram 700 of a communications manager 720 that supports enhanced control format feedback in accordance with one or more aspects of the present disclosure. The communications manager 720 may be an example of aspects of a communications manager 520, a communications manager 620, or both, as described herein. The communications manager 720, or various components thereof, may be an example of means for performing various aspects of enhanced control format feedback as described herein. For example, the communications manager 720 may include a control component 725, a feedback component 730, a configuration component 735, an operation component 740, a decoding component 745, or any combination thereof. Each of these components, or components or subcomponents thereof (e.g., one or more processors, one or more memories), may communicate, directly or indirectly, with one another (e.g., via one or more buses).

The communications manager 720 may support wireless communications in accordance with examples as disclosed herein. The control component 725 is capable of, configured to, or operable to support a means for monitoring for a control message including scheduling information for a downlink message for the UE and including command information instructing the UE to perform an operation. The feedback component 730 is capable of, configured to, or operable to support a means for generating feedback associated with the control message based on the monitoring, the feedback indicating whether the UE successfully decoded the control message, whether the UE successfully received the downlink message, and whether the UE successfully performed the operation. The configuration component 735 is capable of, configured to, or operable to support a means for transmitting a feedback message including the generated feedback in accordance with a feedback configuration.

In some examples, to support monitoring for the control message, the operation component 740 is capable of, configured to, or operable to support a means for receiving, in the control message, the command information instructing the UE to switch from a first BWP to a second BWP, from a first SCell dormancy state to a second SCell dormancy state, from a first TCI state to a second TCI state, from a first SSSG to a second SSSG, from a first minimum scheduling offset to a second minimum scheduling offset, or a combination thereof.

In some examples, the configuration component 735 is capable of, configured to, or operable to support a means for receiving an indication of the feedback configuration via an RRC message or a MAC-CE.

In some examples, to support monitoring for the control message, the control component 725 is capable of, configured to, or operable to support a means for receiving the control message in accordance with a subcodebook of a set of multiple subcodebooks, where each subcodebook of the set of multiple subcodebooks is associated with a respective DCI format, and where the feedback is a 2-bit message based on the subcodebook is associated with a two-bit DCI format.

In some examples, to support monitoring for the control message, the configuration component 735 is capable of, configured to, or operable to support a means for receiving, in the control message, a BWP indicator, a SCell dormancy indication, a TCI state indication, a minimum scheduling offset indicator, or a combination thereof.

In some examples, the decoding component 745 is capable of, configured to, or operable to support a means for failing to decode the control message based on the monitoring. In some examples, the operation component 740 is capable of, configured to, or operable to support a means for maintaining one or more UE operations according to a current BWP indicator, a current SCell dormancy indication, a current TCI state indication, a current scheduling offset indicator, or a combination thereof based on a failure to decode the control message.

In some examples, to support generating the feedback, the feedback component 730 is capable of, configured to, or operable to support a means for generating feedback indicating that the UE successfully decoded the control message, that the UE failed to receive the downlink message, and that the UE successfully performed the operation.

In some examples, the operation component 740 is capable of, configured to, or operable to support a means for receiving an indication of whether the UE is to perform the operation instructed by the command information if the UE successfully decodes the control message and if the UE fails to decode the downlink message scheduled by the control message.

In some examples, the operation component 740 is capable of, configured to, or operable to support a means for receiving an indication of timing information associated with a time at which the UE is to perform the operation.

In some examples, the scheduling information indicates an absence of the downlink message.

In some examples, the feedback message is a one-bit message based on the scheduling information indicating the absence of the downlink message.

In some examples, the feedback message is a two-bit message based on the scheduling information indicating the absence of the downlink message.

In some examples, the decoding component 745 is capable of, configured to, or operable to support a means for receiving an indication of a downlink assignment index. In some examples, the decoding component 745 is capable of, configured to, or operable to support a means for successfully decoding the control message, where the feedback message is a one-bit message based on successfully decoding the control message and based on the downlink assignment index being a value of 1.

Figure 8:
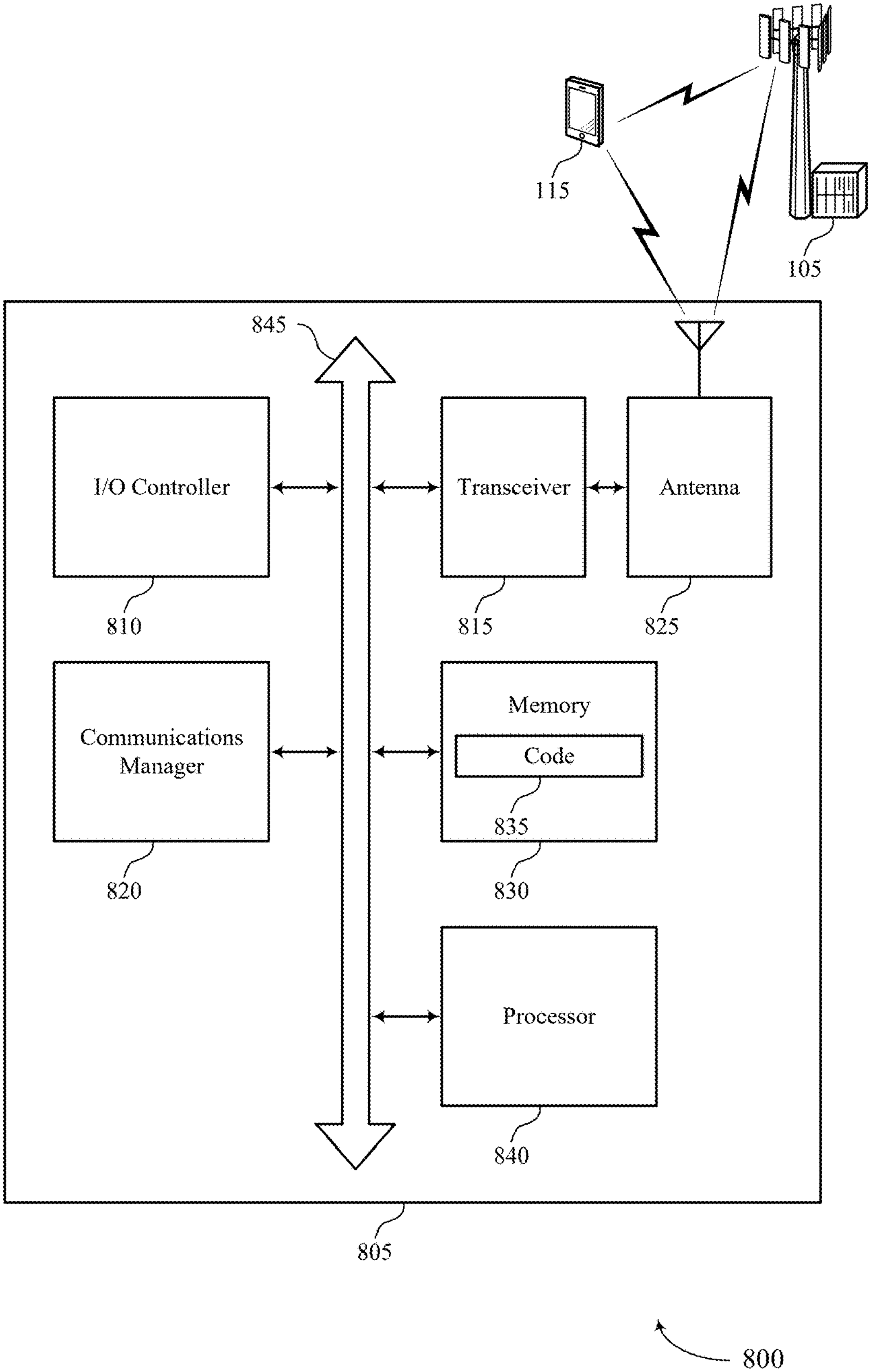
FIG. 8 shows a diagram of a system including a device that supports enhanced control format feedback in accordance with one or more aspects of the present disclosure.

FIG. 8 shows a diagram of a system 800 including a device 805 that supports enhanced control format feedback in accordance with one or more aspects of the present disclosure. The device 805 may be an example of or include components of a device 505, a device 605, or a UE 115 as described herein. The device 805 may communicate (e.g., wirelessly) with one or more other devices (e.g., network entities 105, UEs 115, or a combination thereof). The device 805 may include components for bi-directional voice and data communications including components for transmitting and receiving communications, such as a communications manager 820, an input/output (I/O) controller, such as an I/O controller 810, a transceiver 815, one or more antennas 825, at least one memory 830, code 835, and at least one processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally, or alternatively, the I/O controller 810 may represent or interact with a modem, a keyboard, a mouse, a touchscreen, or a similar device. In some cases, the I/O controller 810 may be implemented as part of one or more processors, such as the at least one processor 840. In some cases, a user may interact with the device 805 via the I/O controller 810 or via hardware components controlled by the I/O controller 810.

In some cases, the device 805 may include a single antenna. However, in some other cases, the device 805 may have more than one antenna, which may be capable of concurrently transmitting or receiving multiple wireless transmissions. The transceiver 815 may communicate bi-directionally via the one or more antennas 825 using wired or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The at least one memory 830 may include random access memory (RAM) and read-only memory (ROM). The at least one memory 830 may store computer-readable, computer-executable, or processor-executable code, such as the code 835. The code 835 may include instructions that, when executed by the at least one processor 840, cause the device 805 to perform various functions described herein. The code 835 may be stored in a non-transitory computer-readable medium such as system memory or another type of memory. In some cases, the code 835 may not be directly executable by the at least one processor 840 but may cause a computer (e.g., when compiled and executed) to perform functions described herein. In some cases, the at least one memory 830 may include, among other things, a basic I/O system (BIOS) which may control basic hardware or software operation such as the interaction with peripheral components or devices.

The at least one processor 840 may include one or more intelligent hardware devices (e.g., one or more general-purpose processors, one or more DSPs, one or more CPUs, one or more graphics processing units (GPUs), one or more neural processing units (NPUs) (also referred to as neural network processors or deep learning processors (DLPs)), one or more microcontrollers, one or more ASICs, one or more FPGAs, one or more programmable logic devices, discrete gate or transistor logic, one or more discrete hardware components, or any combination thereof). In some cases, the at least one processor 840 may be configured to operate a memory array using a memory controller. In some other cases, a memory controller may be integrated into the at least one processor 840. The at least one processor 840 may be configured to execute computer-readable instructions stored in a memory (e.g., the at least one memory 830) to cause the device 805 to perform various functions (e.g., functions or tasks supporting enhanced control format feedback). For example, the device 805 or a component of the device 805 may include at least one processor 840 and at least one memory 830 coupled with or to the at least one processor 840, the at least one processor 840 and the at least one memory 830 configured to perform various functions described herein.

In some examples, the at least one processor 840 may include multiple processors and the at least one memory 830 may include multiple memories. One or more of the multiple processors may be coupled with one or more of the multiple memories, which may, individually or collectively, be configured to perform various functions described herein. In some examples, the at least one processor 840 may be a component of a processing system, which may refer to a system (such as a series) of machines, circuitry (including, for example, one or both of processor circuitry (which may include the at least one processor 840) and memory circuitry (which may include the at least one memory 830)), or components, that receives or obtains inputs and processes the inputs to produce, generate, or obtain a set of outputs. The processing system may be configured to perform one or more of the functions described herein. For example, the at least one processor 840 or a processing system including the at least one processor 840 may be configured to, configurable to, or operable to cause the device 805 to perform one or more of the functions described herein. Further, as described herein, being "configured to," being "configurable to," and being "operable to" may be used interchangeably and may be associated with a capability, when executing code 835 (e.g., processor-executable code) stored in the at least one memory 830 or otherwise, to perform one or more of the functions described herein.

The communications manager 820 may support wireless communications in accordance with examples as disclosed herein. For example, the communications manager 820 is capable of, configured to, or operable to support a means for monitoring for a control message including scheduling information for a downlink message for the UE and including command information instructing the UE to perform an operation. The communications manager 820 is capable of, configured to, or operable to support a means for generating feedback associated with the control message based on the monitoring, the feedback indicating whether the UE successfully decoded the control message, whether the UE successfully received the downlink message, and whether the UE successfully performed the operation. The communications manager 820 is capable of, configured to, or operable to support a means for transmitting a feedback message including the generated feedback in accordance with a feedback configuration.

By including or configuring the communications manager 820 in accordance with examples as described herein, the device 805 may support techniques for improved communication reliability, reduced power consumption, more efficient utilization of communication resources, and improved coordination between devices, longer battery life.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the at least one processor 840, the at least one memory 830, the code 835, or any combination thereof. For example, the code 835 may include instructions executable by the at least one processor 840 to cause the device 805 to perform various aspects of enhanced control format feedback as described herein, or the at least one processor 840 and the at least one memory 830 may be otherwise configured to, individually or collectively, perform or support such operations.

Figure 9:
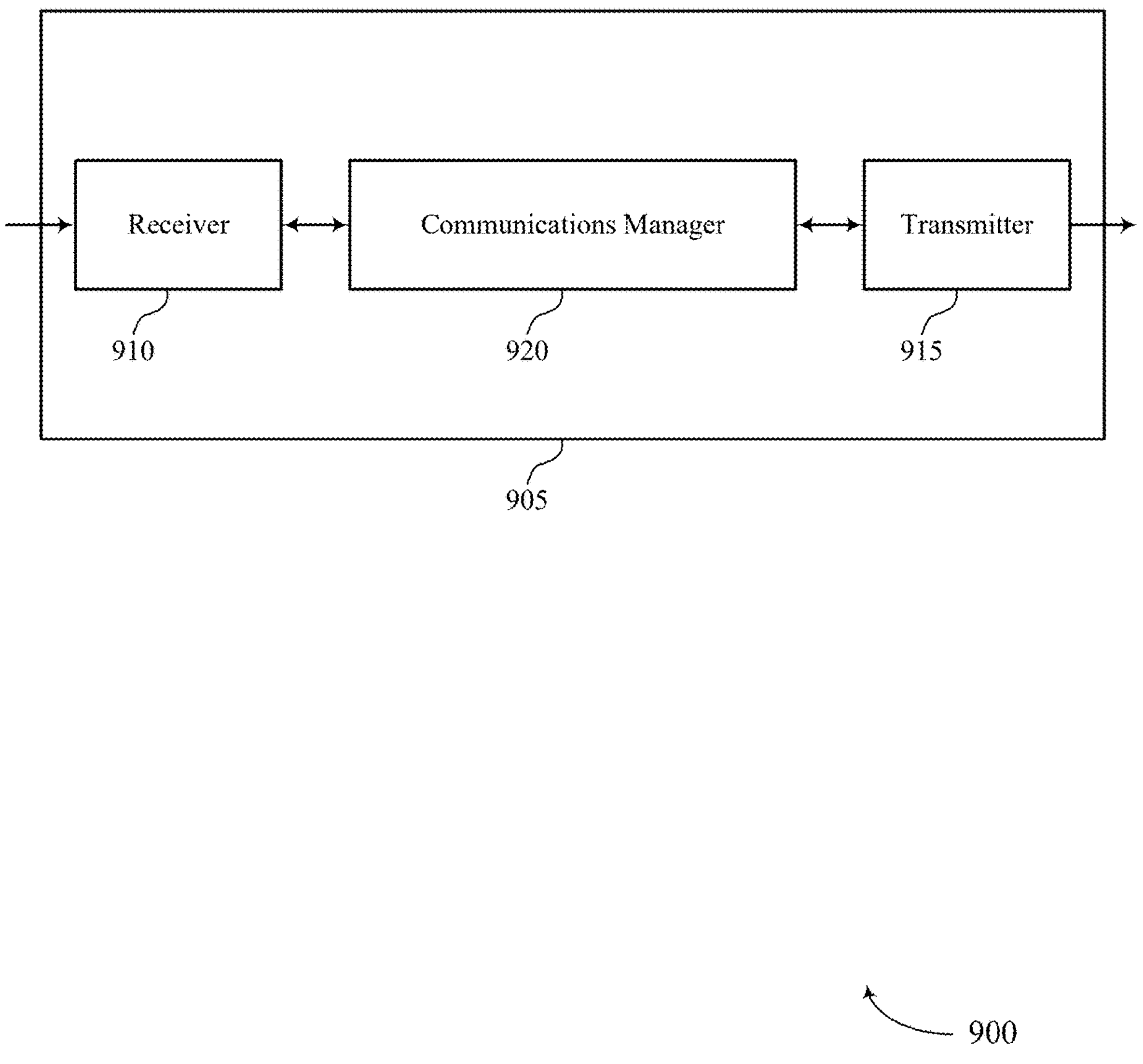
FIGS. 9 and 10 show block diagrams of devices that support enhanced control format feedback in accordance with one or more aspects of the present disclosure.

FIG. 9 shows a block diagram 900 of a device 905 that supports enhanced control format feedback in accordance with one or more aspects of the present disclosure. The device 905 may be an example of aspects of a network entity 105 as described herein. The device 905 may include a receiver 910, a transmitter 915, and a communications manager 920. The device 905, or one or more components of the device 905 (e.g., the receiver 910, the transmitter 915, the communications manager 920), may include at least one processor, which may be coupled with at least one memory, to, individually or collectively, support or enable the described techniques. Each of these components may be in communication with one another (e.g., via one or more buses).

The receiver 910 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 905. In some examples, the receiver 910 may support obtaining information by receiving signals via one or more antennas. Additionally, or alternatively, the receiver 910 may support obtaining information by receiving signals via one or more wired (e.g., electrical, fiber optic) interfaces, wireless interfaces, or any combination thereof.

The transmitter 915 may provide a means for outputting (e.g., transmitting, providing, conveying, sending) information generated by other components of the device 905. For example, the transmitter 915 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 915 may support outputting information by transmitting signals via one or more antennas. Additionally, or alternatively, the transmitter 915 may support outputting information by transmitting signals via one or more wired (e.g., electrical, fiber optic) interfaces, wireless interfaces, or any combination thereof. In some examples, the transmitter 915 and the receiver 910 may be co-located in a transceiver, which may include or be coupled with a modem.

The communications manager 920, the receiver 910, the transmitter 915, or various combinations or components thereof may be examples of means for performing various aspects of enhanced control format feedback as described herein. For example, the communications manager 920, the receiver 910, the transmitter 915, or various combinations or components thereof may be capable of performing one or more of the functions described herein.

In some examples, the communications manager 920, the receiver 910, the transmitter 915, or various combinations or components thereof may be implemented in hardware (e.g., in communications management circuitry). The hardware may include at least one of a processor, a DSP, a CPU, an ASIC, an FPGA or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 920, the receiver 910, the transmitter 915, or various combinations or components thereof may be implemented in code (e.g., as communications management software or firmware) executed by at least one processor (e.g., referred to as a processor-executable code). If implemented in code executed by at least one processor, the functions of the communications manager 920, the receiver 910, the transmitter 915, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 920 may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communications in accordance with examples as disclosed herein. For example, the communications manager 920 is capable of, configured to, or operable to support a means for outputting a control message including scheduling information for a downlink message for a UE and command information instructing the UE to perform an operation. The communications manager 920 is capable of, configured to, or operable to support a means for obtaining feedback associated with the control message and in accordance with a feedback configuration, the feedback indicating whether the UE successfully decoded the control message, whether the UE successfully received the downlink message, and whether the UE successfully performed the operation.

By including or configuring the communications manager 920 in accordance with examples as described herein, the device 905 (e.g., at least one processor controlling or otherwise coupled with the receiver 910, the transmitter 915, the communications manager 920, or a combination thereof) may support techniques for reduced power consumption and more efficient utilization of communication resources.

Figure 10:
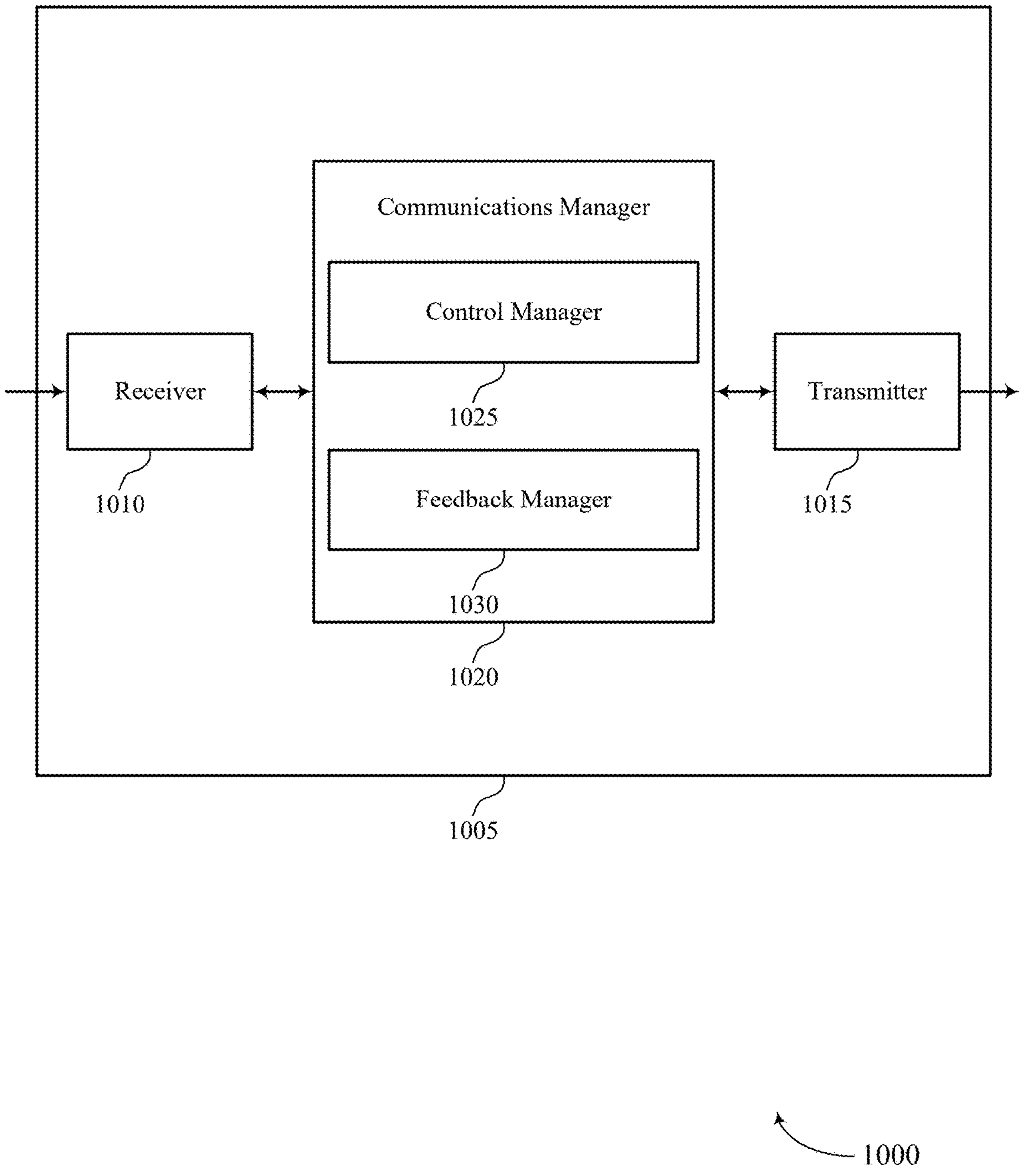

FIG. 10 shows a block diagram 1000 of a device 1005 that supports enhanced control format feedback in accordance with one or more aspects of the present disclosure. The device 1005 may be an example of aspects of a device 905 or a network entity 105 as described herein. The device 1005 may include a receiver 1010, a transmitter 1015, and a communications manager 1020. The device 1005, or one or more components of the device 1005 (e.g., the receiver 1010, the transmitter 1015, the communications manager 1020), may include at least one processor, which may be coupled with at least one memory, to support the described techniques. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The device 1005, or various components thereof, may be an example of means for performing various aspects of enhanced control format feedback as described herein. For example, the communications manager 1020 may include a control manager 1025 a feedback manager 1030, or any combination thereof. The communications manager 1020 may be an example of aspects of a communications manager 920 as described herein. In some examples, the communications manager 1020, or various components thereof, may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communications in accordance with examples as disclosed herein. The control manager 1025 is capable of, configured to, or operable to support a means for outputting a control message including scheduling information for a downlink message for a UE and command information instructing the UE to perform an operation. The feedback manager 1030 is capable of, configured to, or operable to support a means for obtaining feedback associated with the control message and in accordance with a feedback configuration, the feedback indicating whether the UE successfully decoded the control message, whether the UE successfully received the downlink message, and whether the UE successfully performed the operation.

Figure 11:
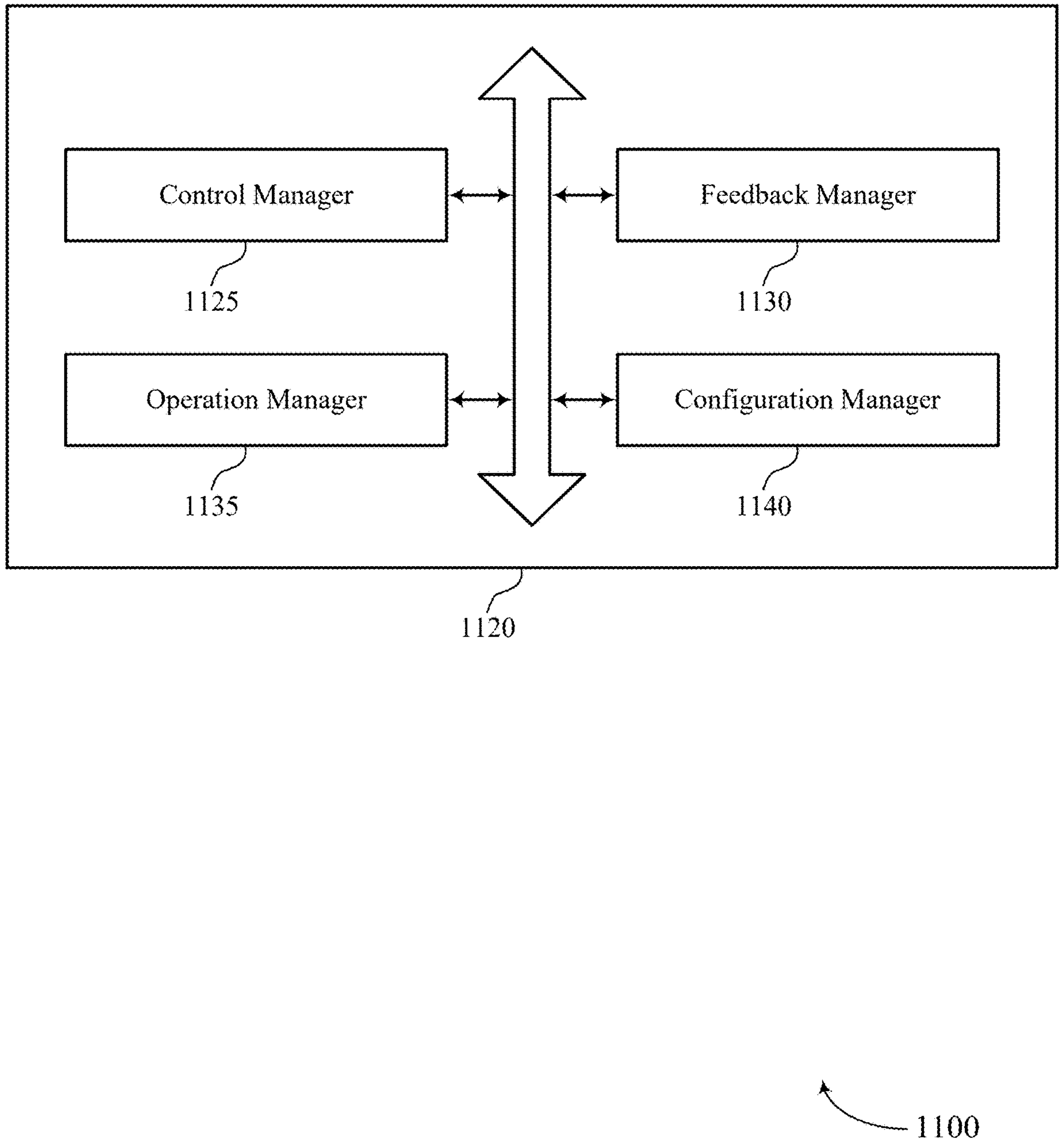
FIG. 11 shows a block diagram of a communications manager that supports enhanced control format feedback in accordance with one or more aspects of the present disclosure.

FIG. 11 shows a block diagram 1100 of a communications manager 1120 that supports enhanced control format feedback in accordance with one or more aspects of the present disclosure. The communications manager 1120 may be an example of aspects of a communications manager 920, a communications manager 1020, or both, as described herein. The communications manager 1120, or various components thereof, may be an example of means for performing various aspects of enhanced control format feedback as described herein. For example, the communications manager 1120 may include a control manager 1125, a feedback manager 1130, an operation manager 1135, a configuration manager 1140, or any combination thereof. Each of these components, or components or subcomponents thereof (e.g., one or more processors, one or more memories), may communicate, directly or indirectly, with one another (e.g., via one or more buses). The communications may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1120 may support wireless communications in accordance with examples as disclosed herein. The control manager 1125 is capable of, configured to, or operable to support a means for outputting a control message including scheduling information for a downlink message for a UE and command information instructing the UE to perform an operation. The feedback manager 1130 is capable of, configured to, or operable to support a means for obtaining feedback associated with the control message and in accordance with a feedback configuration, the feedback indicating whether the UE successfully decoded the control message, whether the UE successfully received the downlink message, and whether the UE successfully performed the operation.

In some examples, to support outputting the control message, the operation manager 1135 is capable of, configured to, or operable to support a means for outputting, in the control message, the command information instructing the UE to switch from a first BWP to a second BWP, from a first SCell dormancy state to a second SCell dormancy state, from a first TCI state to a second TCI state, from a first SSSG to a second SSSG, from a first minimum scheduling offset to a second minimum scheduling offset, or a combination thereof.

In some examples, the configuration manager 1140 is capable of, configured to, or operable to support a means for outputting an indication of the feedback configuration via an RRC message or a MAC-CE.

In some examples, to support outputting the control message, the control manager 1125 is capable of, configured to, or operable to support a means for outputting the control message in accordance with a subcodebook of a set of multiple subcodebooks, where each subcodebook of the set of multiple subcodebooks is associated with a respective DCI format, and where the feedback is a 2-bit message based on the subcodebook is associated with a two-bit DCI format.

In some examples, to support outputting the control message, the configuration manager 1140 is capable of, configured to, or operable to support a means for outputting, in the control message, a BWP indicator, a SCell dormancy indication, a TCI state indication, a minimum scheduling offset indicator, or a combination thereof.

In some examples, to support obtaining the feedback, the feedback manager 1130 is capable of, configured to, or operable to support a means for obtaining feedback indicating that the UE successfully decoded the control message, that the UE failed to receive the downlink message, and that the UE successfully performed the operation.

In some examples, the operation manager 1135 is capable of, configured to, or operable to support a means for outputting an indication of whether the UE is to perform the operation instructed by the command information if the UE successfully decodes the control message and if the UE fails to decode the downlink message scheduled by the control message.

In some examples, the operation manager 1135 is capable of, configured to, or operable to support a means for outputting an indication of timing information associated with a time at which the UE is to perform the operation.

In some examples, the scheduling information indicates an absence of the downlink message.

In some examples, the feedback is a one-bit message based on the scheduling information indicating the absence of the downlink message.

In some examples, the feedback is a two-bit message based on the scheduling information indicating the absence of the downlink message.

In some examples, the feedback manager 1130 is capable of, configured to, or operable to support a means for outputting an indication of a downlink assignment index, where the feedback is a one-bit message based on the feedback indicating that the UE successfully decoded the control message and based on the downlink assignment index being a value of 1.

Figure 12:
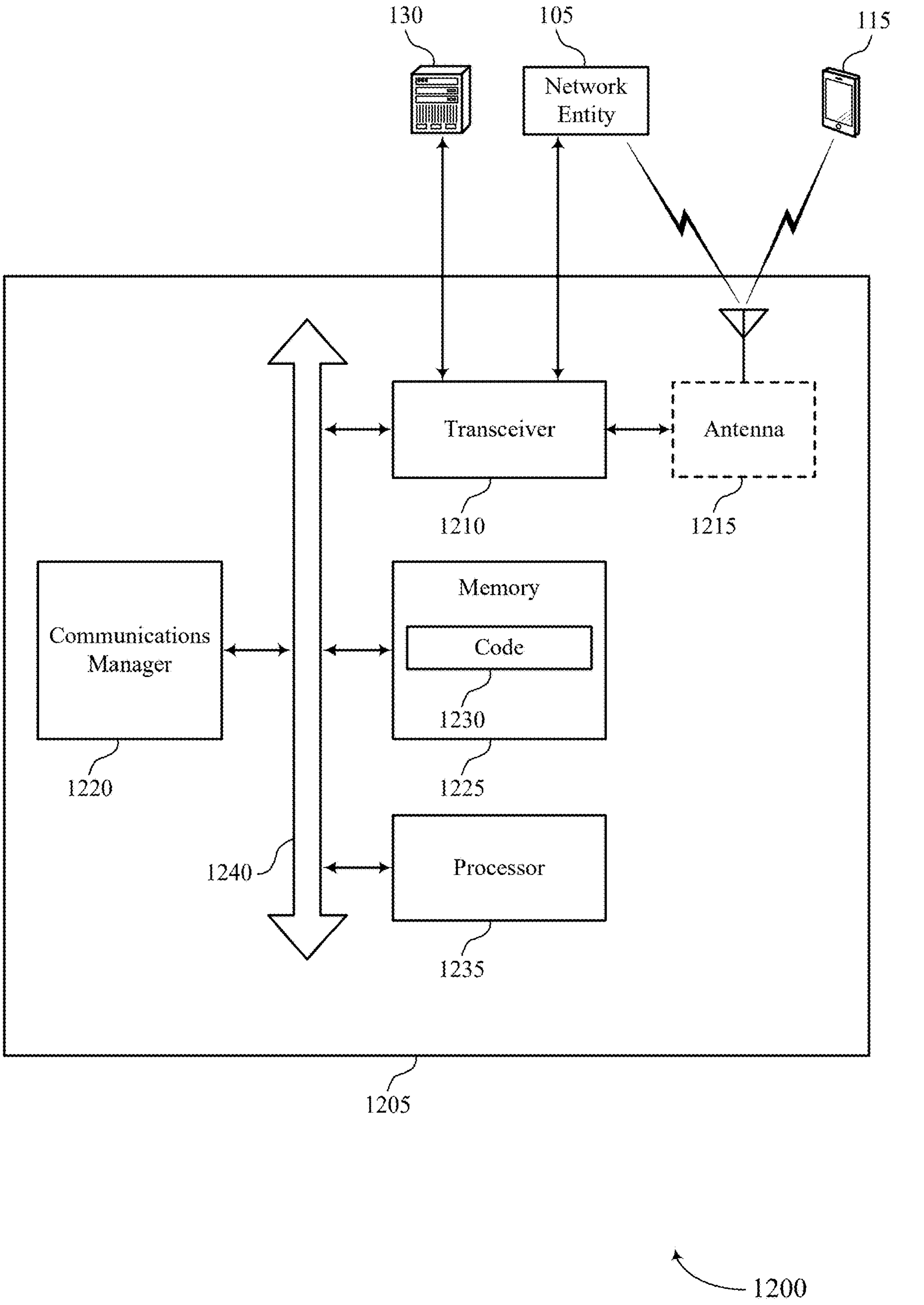
FIG. 12 shows a diagram of a system including a device that supports enhanced control format feedback in accordance with one or more aspects of the present disclosure.

FIG. 12 shows a diagram of a system 1200 including a device 1205 that supports enhanced control format feedback in accordance with one or more aspects of the present disclosure. The device 1205 may be an example of or include components of a device 905, a device 1005, or a network entity 105 as described herein. The device 1205 may communicate with other network devices or network equipment such as one or more of the network entities 105, UEs 115, or any combination thereof. The communications may include communications over one or more wired interfaces, over one or more wireless interfaces, or any combination thereof. The device 1205 may include components that support outputting and obtaining communications, such as a communications manager 1220, a transceiver 1210, one or more antennas 1215, at least one memory 1225, code 1230, and at least one processor 1235. These components may be in electronic communication or otherwise coupled (e.g., operatively, communicatively, functionally, electronically, electrically) via one or more buses (e.g., a bus 1240).

The transceiver 1210 may support bi-directional communications via wired links, wireless links, or both as described herein. In some examples, the transceiver 1210 may include a wired transceiver and may communicate bi-directionally with another wired transceiver. Additionally, or alternatively, in some examples, the transceiver 1210 may include a wireless transceiver and may communicate bi-directionally with another wireless transceiver. In some examples, the device 1205 may include one or more antennas 1215, which may be capable of transmitting or receiving wireless transmissions (e.g., concurrently). The transceiver 1210 may also include a modem to modulate signals, to provide the modulated signals for transmission (e.g., by one or more antennas 1215, by a wired transmitter), to receive modulated signals (e.g., from one or more antennas 1215, from a wired receiver), and to demodulate signals. In some implementations, the transceiver 1210 may include one or more interfaces, such as one or more interfaces coupled with the one or more antennas 1215 that are configured to support various receiving or obtaining operations, or one or more interfaces coupled with the one or more antennas 1215 that are configured to support various transmitting or outputting operations, or a combination thereof. In some implementations, the transceiver 1210 may include or be configured for coupling with one or more processors or one or more memory components that are operable to perform or support operations based on received or obtained information or signals, or to generate information or other signals for transmission or other outputting, or any combination thereof. In some implementations, the transceiver 1210, or the transceiver 1210 and the one or more antennas 1215, or the transceiver 1210 and the one or more antennas 1215 and one or more processors or one or more memory components (e.g., the at least one processor 1235, the at least one memory 1225, or both), may be included in a chip or chip assembly that is installed in the device 1205. In some examples, the transceiver 1210 may be operable to support communications via one or more communications links (e.g., communication link(s) 125, backhaul communication link(s) 120, a midhaul communication link 162, a fronthaul communication link 168).

The at least one memory 1225 may include RAM, ROM, or any combination thereof. The at least one memory 1225 may store computer-readable, computer-executable, or processor-executable code, such as the code 1230. The code 1230 may include instructions that, when executed by one or more of the at least one processor 1235, cause the device 1205 to perform various functions described herein. The code 1230 may be stored in a non-transitory computer-readable medium such as system memory or another type of memory. In some cases, the code 1230 may not be directly executable by a processor of the at least one processor 1235 but may cause a computer (e.g., when compiled and executed) to perform functions described herein. In some cases, the at least one memory 1225 may include, among other things, a BIOS which may control basic hardware or software operation such as the interaction with peripheral components or devices. In some examples, the at least one processor 1235 may include multiple processors and the at least one memory 1225 may include multiple memories. One or more of the multiple processors may be coupled with one or more of the multiple memories which may, individually or collectively, be configured to perform various functions herein (for example, as part of a processing system).

The at least one processor 1235 may include one or more intelligent hardware devices (e.g., one or more general-purpose processors, one or more DSPs, one or more CPUs, one or more graphics processing units (GPUs), one or more neural processing units (NPUs) (also referred to as neural network processors or deep learning processors (DLPs)), one or more microcontrollers, one or more ASICs, one or more FPGAs, one or more programmable logic devices, discrete gate or transistor logic, one or more discrete hardware components, or any combination thereof). In some cases, the at least one processor 1235 may be configured to operate a memory array using a memory controller. In some other cases, a memory controller may be integrated into one or more of the at least one processor 1235. The at least one processor 1235 may be configured to execute computer-readable instructions stored in a memory (e.g., one or more of the at least one memory 1225) to cause the device 1205 to perform various functions (e.g., functions or tasks supporting enhanced control format feedback). For example, the device 1205 or a component of the device 1205 may include at least one processor 1235 and at least one memory 1225 coupled with one or more of the at least one processor 1235, the at least one processor 1235 and the at least one memory 1225 configured to perform various functions described herein. The at least one processor 1235 may be an example of a cloud-computing platform (e.g., one or more physical nodes and supporting software such as operating systems, virtual machines, or container instances) that may host the functions (e.g., by executing code 1230) to perform the functions of the device 1205. The at least one processor 1235 may be any one or more suitable processors capable of executing scripts or instructions of one or more software programs stored in the device 1205 (such as within one or more of the at least one memory 1225).

In some examples, the at least one processor 1235 may include multiple processors and the at least one memory 1225 may include multiple memories. One or more of the multiple processors may be coupled with one or more of the multiple memories, which may, individually or collectively, be configured to perform various functions herein. In some examples, the at least one processor 1235 may be a component of a processing system, which may refer to a system (such as a series) of machines, circuitry (including, for example, one or both of processor circuitry (which may include the at least one processor 1235) and memory circuitry (which may include the at least one memory 1225)), or components, that receives or obtains inputs and processes the inputs to produce, generate, or obtain a set of outputs. The processing system may be configured to perform one or more of the functions described herein. For example, the at least one processor 1235 or a processing system including the at least one processor 1235 may be configured to, configurable to, or operable to cause the device 1205 to perform one or more of the functions described herein. Further, as described herein, being "configured to," being "configurable to," and being "operable to" may be used interchangeably and may be associated with a capability, when executing code stored in the at least one memory 1225 or otherwise, to perform one or more of the functions described herein.

In some examples, a bus 1240 may support communications of (e.g., within) a protocol layer of a protocol stack. In some examples, a bus 1240 may support communications associated with a logical channel of a protocol stack (e.g., between protocol layers of a protocol stack), which may include communications performed within a component of the device 1205, or between different components of the device 1205 that may be co-located or located in different locations (e.g., where the device 1205 may refer to a system in which one or more of the communications manager 1220, the transceiver 1210, the at least one memory 1225, the code 1230, and the at least one processor 1235 may be located in one of the different components or divided between different components).

In some examples, the communications manager 1220 may manage aspects of communications with a core network 130 (e.g., via one or more wired or wireless backhaul links). For example, the communications manager 1220 may manage the transfer of data communications for client devices, such as one or more UEs 115. In some examples, the communications manager 1220 may manage communications with one or more other network entities 105, and may include a controller or scheduler for controlling communications with UEs 115 (e.g., in cooperation with the one or more other network devices). In some examples, the communications manager 1220 may support an X2 interface within an LTE/LTE-A wireless communications network technology to provide communication between network entities 105.

The communications manager 1220 may support wireless communications in accordance with examples as disclosed herein. For example, the communications manager 1220 is capable of, configured to, or operable to support a means for outputting a control message including scheduling information for a downlink message for a UE and command information instructing the UE to perform an operation. The communications manager 1220 is capable of, configured to, or operable to support a means for obtaining feedback associated with the control message and in accordance with a feedback configuration, the feedback indicating whether the UE successfully decoded the control message, whether the UE successfully received the downlink message, and whether the UE successfully performed the operation.

By including or configuring the communications manager 1220 in accordance with examples as described herein, the device 1205 may support techniques for improved communication reliability, reduced power consumption, more efficient utilization of communication resources, improved coordination between devices, and longer battery life.

In some examples, the communications manager 1220 may be configured to perform various operations (e.g., receiving, obtaining, monitoring, outputting, transmitting) using or otherwise in cooperation with the transceiver 1210, the one or more antennas 1215 (e.g., where applicable), or any combination thereof. Although the communications manager 1220 is illustrated as a separate component, in some examples, one or more functions described with reference to the communications manager 1220 may be supported by or performed by the transceiver 1210, one or more of the at least one processor 1235, one or more of the at least one memory 1225, the code 1230, or any combination thereof (for example, by a processing system including at least a portion of the at least one processor 1235, the at least one memory 1225, the code 1230, or any combination thereof). For example, the code 1230 may include instructions executable by one or more of the at least one processor 1235 to cause the device 1205 to perform various aspects of enhanced control format feedback as described herein, or the at least one processor 1235 and the at least one memory 1225 may be otherwise configured to, individually or collectively, perform or support such operations.

Figure 13:
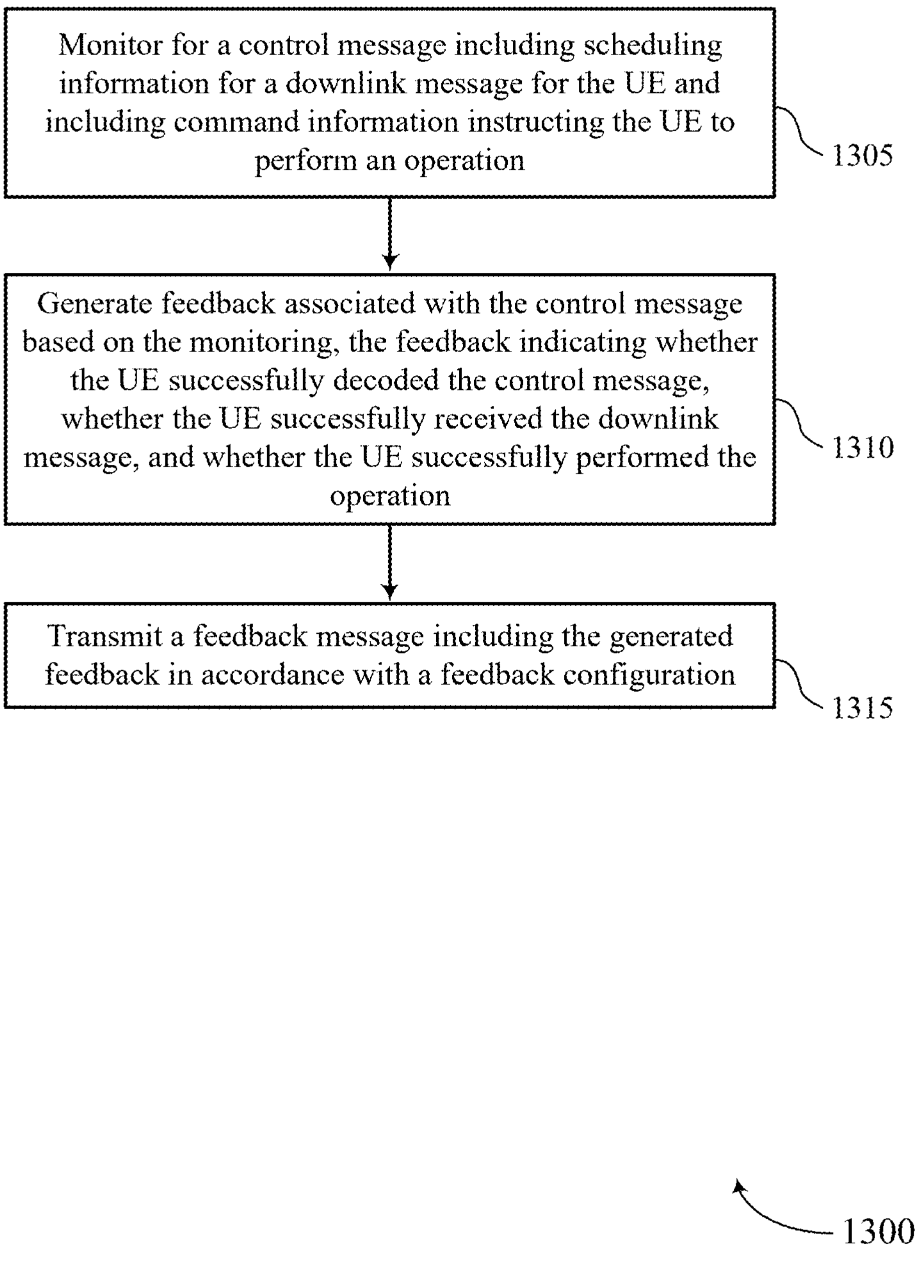
FIGS. 13 through 16 show flowcharts illustrating methods that support enhanced control format feedback in accordance with one or more aspects of the present disclosure.

FIG. 13 shows a flowchart illustrating a method 1300 that supports enhanced control format feedback in accordance with one or more aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1305, the method may include monitoring for a control message including scheduling information for a downlink message for the UE and including command information instructing the UE to perform an operation. The operations of 1305 may be performed in accordance with examples as disclosed herein. In some examples, aspects of the operations of 1305 may be performed by a control component 725 as described with reference to FIG. 7.

At 1310, the method may include generating feedback associated with the control message based on the monitoring, the feedback indicating whether the UE successfully decoded the control message, whether the UE successfully received the downlink message, and whether the UE successfully performed the operation. The operations of 1310 may be performed in accordance with examples as disclosed herein. In some examples, aspects of the operations of 1310 may be performed by a feedback component 730 as described with reference to FIG. 7.

At 1315, the method may include transmitting a feedback message including the generated feedback in accordance with a feedback configuration. The operations of 1315 may be performed in accordance with examples as disclosed herein. In some examples, aspects of the operations of 1315 may be performed by a configuration component 735 as described with reference to FIG. 7.

Figure 14:
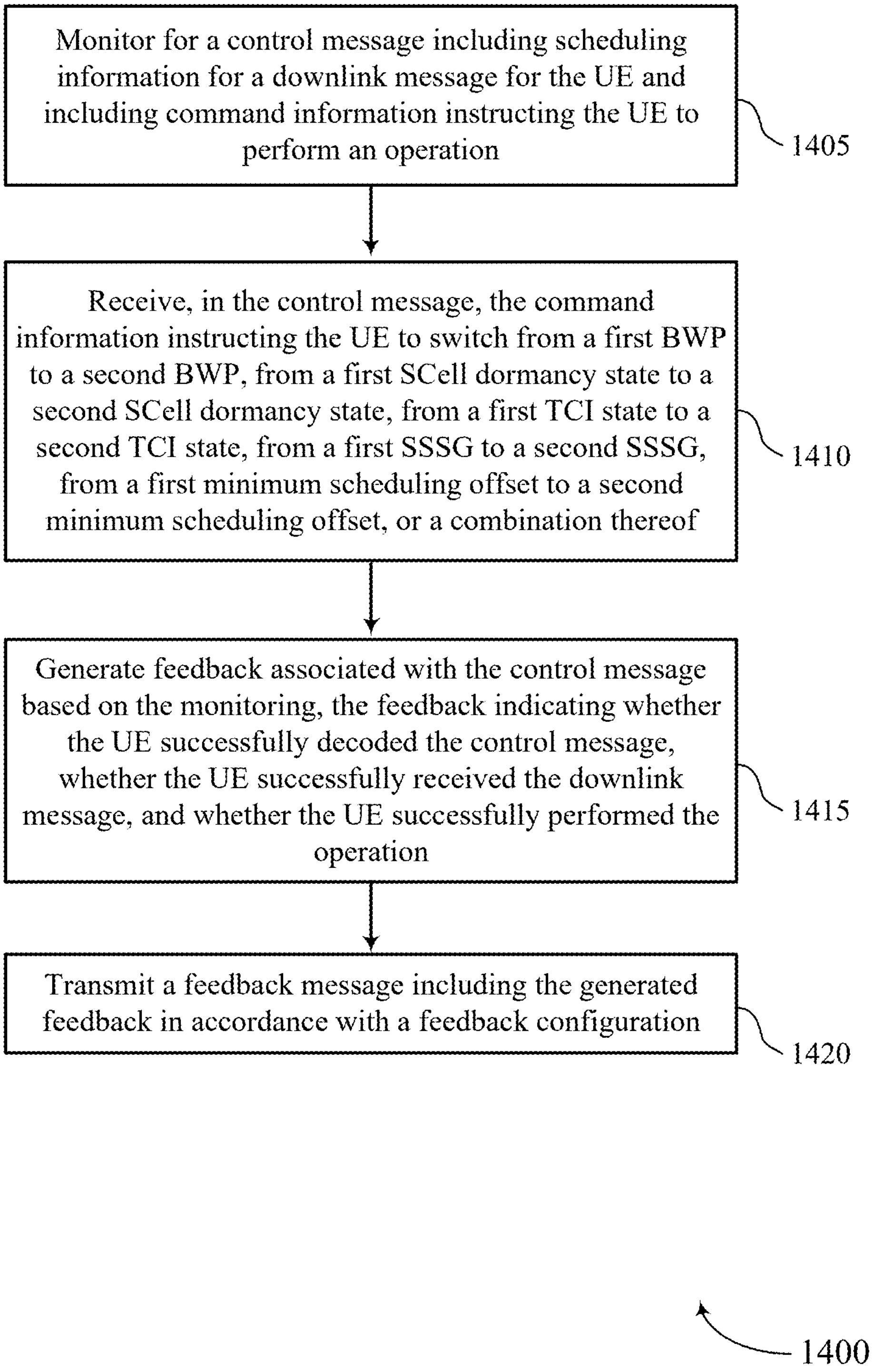

FIG. 14 shows a flowchart illustrating a method 1400 that supports enhanced control format feedback in accordance with one or more aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1405, the method may include monitoring for a control message including scheduling information for a downlink message for the UE and including command information instructing the UE to perform an operation. The operations of 1405 may be performed in accordance with examples as disclosed herein. In some examples, aspects of the operations of 1405 may be performed by a control component 725 as described with reference to FIG. 7.

At 1410, the method may include receiving, in the control message, the command information instructing the UE to switch from a first BWP to a second BWP, from a first SCell dormancy state to a second SCell dormancy state, from a first TCI state to a second TCI state, from a first SSSG to a second SSSG, from a first minimum scheduling offset to a second minimum scheduling offset, or a combination thereof. The operations of 1410 may be performed in accordance with examples as disclosed herein. In some examples, aspects of the operations of 1410 may be performed by an operation component 740 as described with reference to FIG. 7.

At 1415, the method may include generating feedback associated with the control message based on the monitoring, the feedback indicating whether the UE successfully decoded the control message, whether the UE successfully received the downlink message, and whether the UE successfully performed the operation. The operations of 1415 may be performed in accordance with examples as disclosed herein. In some examples, aspects of the operations of 1415 may be performed by a feedback component 730 as described with reference to FIG. 7.

At 1420, the method may include transmitting a feedback message including the generated feedback in accordance with a feedback configuration. The operations of 1420 may be performed in accordance with examples as disclosed herein. In some examples, aspects of the operations of 1420 may be performed by a configuration component 735 as described with reference to FIG. 7.

Figure 15:
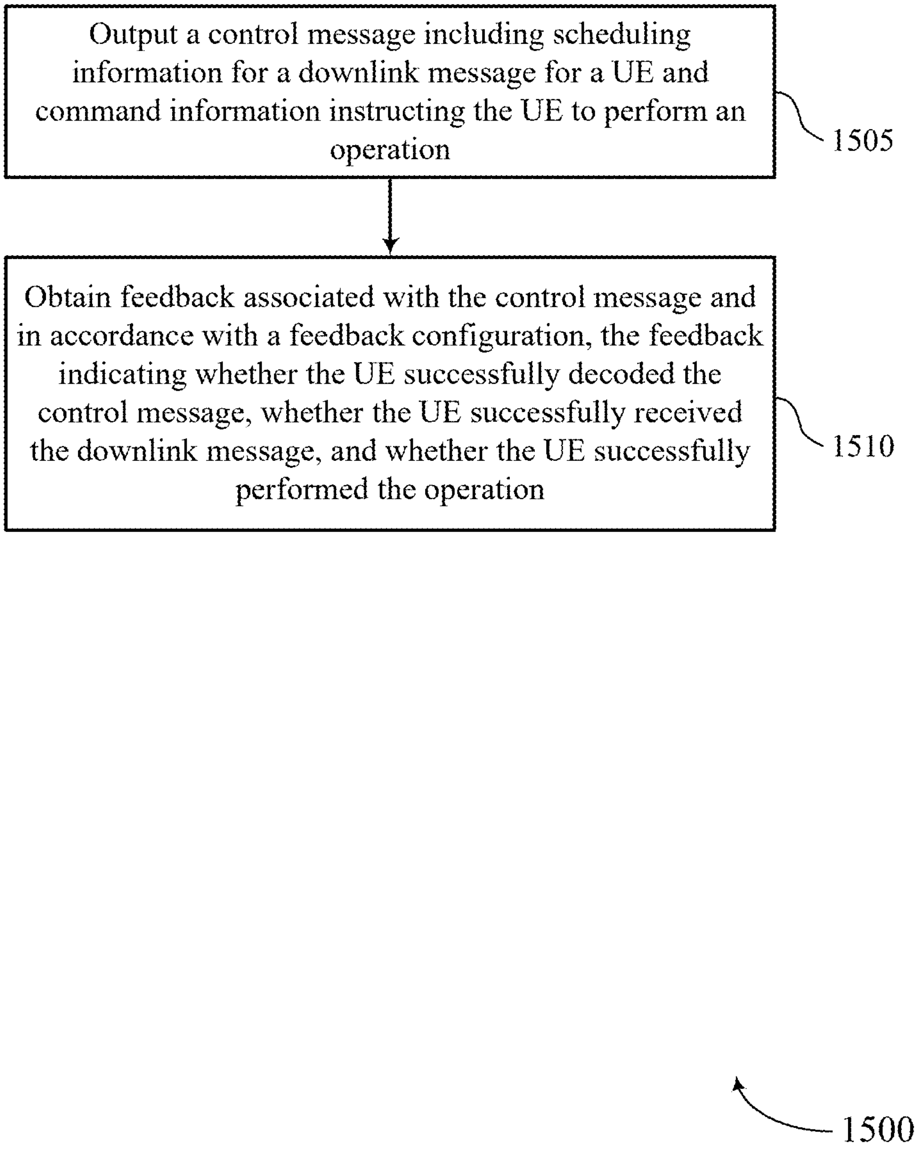

FIG. 15 shows a flowchart illustrating a method 1500 that supports enhanced control format feedback in accordance with one or more aspects of the present disclosure. The operations of the method 1500 may be implemented by a network entity or its components as described herein. For example, the operations of the method 1500 may be performed by a network entity as described with reference to FIGS. 1 through 4 and 9 through 12. In some examples, a network entity may execute a set of instructions to control the functional elements of the network entity to perform the described functions. Additionally, or alternatively, the network entity may perform aspects of the described functions using special-purpose hardware.

At 1505, the method may include outputting a control message including scheduling information for a downlink message for a UE and command information instructing the UE to perform an operation. The operations of 1505 may be performed in accordance with examples as disclosed herein. In some examples, aspects of the operations of 1505 may be performed by a control manager 1125 as described with reference to FIG. 11.

At 1510, the method may include obtaining feedback associated with the control message and in accordance with a feedback configuration, the feedback indicating whether the UE successfully decoded the control message, whether the UE successfully received the downlink message, and whether the UE successfully performed the operation. The operations of 1510 may be performed in accordance with examples as disclosed herein. In some examples, aspects of the operations of 1510 may be performed by a feedback manager 1130 as described with reference to FIG. 11.

Figure 16:
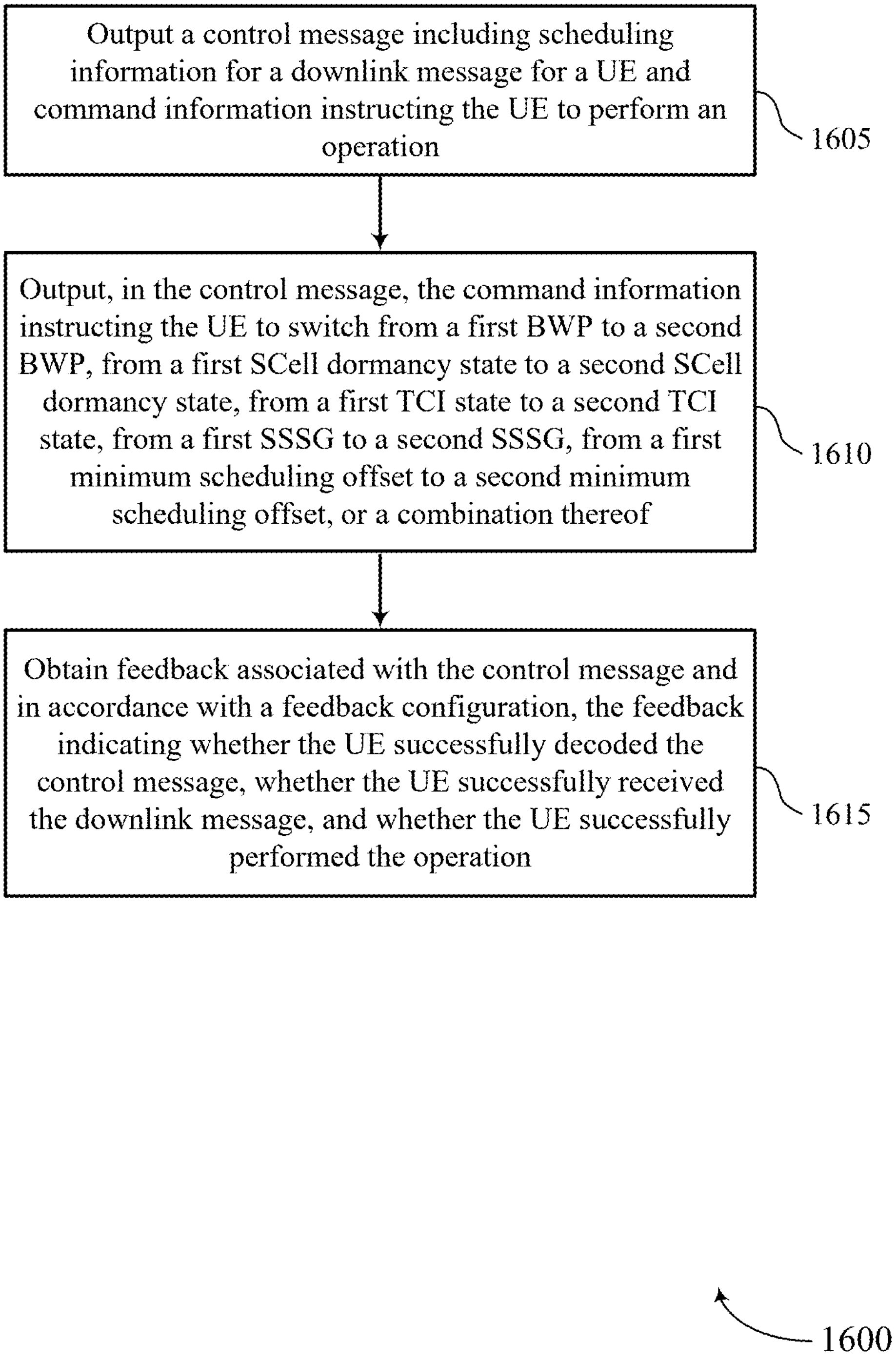

FIG. 16 shows a flowchart illustrating a method 1600 that supports enhanced control format feedback in accordance with one or more aspects of the present disclosure. The operations of the method 1600 may be implemented by a network entity or its components as described herein. For example, the operations of the method 1600 may be performed by a network entity as described with reference to FIGS. 1 through 4 and 9 through 12. In some examples, a network entity may execute a set of instructions to control the functional elements of the network entity to perform the described functions. Additionally, or alternatively, the network entity may perform aspects of the described functions using special-purpose hardware.

At 1605, the method may include outputting a control message including scheduling information for a downlink message for a UE and command information instructing the UE to perform an operation. The operations of 1605 may be performed in accordance with examples as disclosed herein. In some examples, aspects of the operations of 1605 may be performed by a control manager 1125 as described with reference to FIG. 11.

At 1610, the method may include outputting, in the control message, the command information instructing the UE to switch from a first BWP to a second BWP, from a first SCell dormancy state to a second SCell dormancy state, from a first TCI state to a second TCI state, from a first SSSG to a second SSSG, from a first minimum scheduling offset to a second minimum scheduling offset, or a combination thereof. The operations of 1610 may be performed in accordance with examples as disclosed herein. In some examples, aspects of the operations of 1610 may be performed by an operation manager 1135 as described with reference to FIG. 11.

At 1615, the method may include obtaining feedback associated with the control message and in accordance with a feedback configuration, the feedback indicating whether the UE successfully decoded the control message, whether the UE successfully received the downlink message, and whether the UE successfully performed the operation. The operations of 1615 may be performed in accordance with examples as disclosed herein. In some examples, aspects of the operations of 1615 may be performed by a feedback manager 1130 as described with reference to FIG. 11.

Aspect 1: A method for wireless communications at a UE, comprising: monitoring for a control message comprising scheduling information for a downlink message for the UE and comprising command information instructing the UE to perform an operation; generating feedback associated with the control message based at least in part on the monitoring, the feedback indicating whether the UE successfully decoded the control message, whether the UE successfully received the downlink message, and whether the UE successfully performed the operation; and transmitting a feedback message including the generated feedback in accordance with a feedback configuration.

Aspect 2: The method of aspect 1, wherein monitoring for the control message comprises: receiving, in the control message, the command information instructing the UE to switch from a first bandwidth part (BWP) to a second BWP, from a first secondary cell (SCell) dormancy state to a second SCell dormancy state, from a first transmission configuration indication (TCI) state to a second TCI state, from a first search space set group (SSSG) to a second SSSG, from a first minimum scheduling offset to a second minimum scheduling offset, or a combination thereof.

Aspect 3: The method of any of aspects 1 through 2, further comprising: receiving an indication of the feedback configuration via an RRC message or a medium access control-control element (MAC-CE).

Aspect 4: The method of any of aspects 1 through 3, wherein monitoring for the control message comprises: receiving the control message in accordance with a subcodebook of a plurality of subcodebooks, wherein each subcodebook of the plurality of subcodebooks is associated with a respective DCI format, and wherein the feedback is a 2-bit message based at least in part on the subcodebook is associated with a two-bit DCI format.

Aspect 5: The method of any of aspects 1 through 4, wherein monitoring for the control message comprises: receiving, in the control message, a bandwidth part (BWP) indicator, a secondary cell (SCell) dormancy indication, a transmission configuration indication (TCI) state indication, a minimum scheduling offset indicator, or a combination thereof.

Aspect 6: The method of any of aspects 1 through 5, further comprising: failing to decode the control message based at least in part on the monitoring; and maintaining one or more UE operations according to a current bandwidth part (BWP) indicator, a current secondary cell (SCell) dormancy indication, a current transmission configuration indication (TCI) state indication, a current scheduling offset indicator, or a combination thereof based at least in part on a failure to decode the control message.

Aspect 7: The method of any of aspects 1 through 5, wherein generating the feedback comprises: generating feedback indicating that the UE successfully decoded the control message, that the UE failed to receive the downlink message, and that the UE successfully performed the operation.

Aspect 8: The method of any of aspects 1 through 7, further comprising: receiving an indication of whether the UE is to perform the operation instructed by the command information if the UE successfully decodes the control message and if the UE fails to decode the downlink message scheduled by the control message.

Aspect 9: The method of any of aspects 1 through 8, further comprising: receiving an indication of timing information associated with a time at which the UE is to perform the operation.

Aspect 10: The method of any of aspects 1 through 9, wherein the scheduling information indicates an absence of the downlink message.

Aspect 11: The method of aspect 10, wherein the feedback message is a one-bit message based at least in part on the scheduling information indicating the absence of the downlink message.

Aspect 12: The method of any of aspects 10 through 11, wherein the feedback message is a two-bit message based at least in part on the scheduling information indicating an absence of the downlink message.

Aspect 13: The method of any of aspects 1 through 12, further comprising: receiving an indication of a downlink assignment index; and successfully decoding the control message, wherein the feedback message is a one-bit message based at least in part on successfully decoding the control message and based at least in part on the downlink assignment index being a value of 1.

Aspect 14: A method for wireless communications at a network entity, comprising: outputting a control message comprising scheduling information for a downlink message for a UE and command information instructing the UE to perform an operation; and obtaining feedback associated with the control message and in accordance with a feedback configuration, the feedback indicating whether the UE successfully decoded the control message, whether the UE successfully received the downlink message, and whether the UE successfully performed the operation.

Aspect 15: The method of aspect 14, wherein outputting the control message comprises: outputting, in the control message, the command information instructing the UE to switch from a first bandwidth part (BWP) to a second BWP, from a first secondary cell (SCell) dormancy state to a second SCell dormancy state, from a first transmission configuration indication (TCI) state to a second TCI state, from a first search space set group (SSSG) to a second SSSG, from a first minimum scheduling offset to a second minimum scheduling offset, or a combination thereof.

Aspect 16: The method of any of aspects 14 through 15, further comprising: outputting an indication of the feedback configuration via an RRC message or a medium access control-control element (MAC-CE).

Aspect 17: The method of any of aspects 14 through 16, wherein outputting the control message comprises: outputting the control message in accordance with a subcodebook of a plurality of subcodebooks, wherein each subcodebook of the plurality of subcodebooks is associated with a respective DCI format, and wherein the feedback is a 2-bit message based at least in part on the subcodebook is associated with a two-bit DCI format.

Aspect 18: The method of any of aspects 14 through 17, wherein outputting the control message comprises: outputting, in the control message, a bandwidth part (BWP) indicator, a secondary cell (SCell) dormancy indication, a transmission configuration indication (TCI) state indication, a minimum scheduling offset indicator, or a combination thereof.

Aspect 19: The method of any of aspects 14 through 18, wherein obtaining the feedback comprises: obtaining feedback indicating that the UE successfully decoded the control message, that the UE failed to receive the downlink message, and that the UE successfully performed the operation.

Aspect 20: The method of any of aspects 14 through 19, further comprising: outputting an indication of whether the UE is to perform the operation instructed by the command information if the UE successfully decodes the control message and if the UE fails to decode the downlink message scheduled by the control message.

Aspect 21: The method of any of aspects 14 through 20, further comprising: outputting an indication of timing information associated with a time at which the UE is to perform the operation.

Aspect 22: The method of any of aspects 14 through 21, wherein the scheduling information indicates an absence of the downlink message.

Aspect 23: The method of aspect 22, wherein the feedback is a one-bit message based at least in part on the scheduling information indicating the absence of the downlink message.

Aspect 24: The method of any of aspects 22 through 23, wherein the feedback is a two-bit message based at least in part on the scheduling information indicating an absence of the downlink message.

Aspect 25: The method of any of aspects 14 through 24, further comprising: outputting an indication of a downlink assignment index, wherein the feedback is a one-bit message based at least in part on the feedback indicating that the UE successfully decoded the control message and based at least in part on the downlink assignment index being a value of 1.

Aspect 26: A UE for wireless communications, comprising one or more memories storing processor-executable code, and one or more processors coupled with the one or more memories and individually or collectively operable to execute the code to cause the UE to perform a method of any of aspects 1 through 13.

Aspect 27: A UE for wireless communications, comprising at least one means for performing a method of any of aspects 1 through 13.

Aspect 28: A non-transitory computer-readable medium storing code for wireless communications, the code comprising instructions executable by one or more processors to perform a method of any of aspects 1 through 13.

Aspect 29: A network entity for wireless communications, comprising one or more memories storing processor-executable code, and one or more processors coupled with the one or more memories and individually or collectively operable to execute the code to cause the network entity to perform a method of any of aspects 14 through 25.

Aspect 30: A network entity for wireless communications, comprising at least one means for performing a method of any of aspects 14 through 25.

Aspect 31: A non-transitory computer-readable medium storing code for wireless communications, the code comprising instructions executable by one or more processors to perform a method of any of aspects 14 through 25.

It should be noted that the methods described herein describe possible implementations. The operations and the steps may be rearranged or otherwise modified and other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, a graphics processing unit (GPU), a neural processing unit (NPU), an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Any functions or operations described herein as being capable of being performed by a processor may be performed by multiple processors that, individually or collectively, are capable of performing the described functions or operations.

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk, and Blu-ray disc. Disks may reproduce data magnetically, and discs may reproduce data optically using lasers. Combinations of the above are also included within the scope of computer-readable media. Any functions or operations described herein as being capable of being performed by a memory may be performed by multiple memories that, individually or collectively, are capable of performing the described functions or operations.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," and "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The term "determine" or "determining" encompasses a variety of actions and, therefore, "determining" can include calculating, computing, processing, deriving, investigating, looking up (such as via looking up in a table, a database, or another data structure), ascertaining, and the like. Also, "determining" can include receiving (e.g., receiving information), accessing (e.g., accessing data stored in memory), and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label or other subsequent reference label.

The description set forth herein, in connection with the appended drawings, describes example configurations and does not represent all the examples that may be implemented or that are within the scope of the claims. The term "example" used herein means "serving as an example, instance, or illustration" and not "preferred" or "advantageous over other examples." The detailed description includes specific details for the purpose of providing an understanding of the described techniques. These techniques, however, may be practiced without these specific details. In some figures, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A user equipment (UE), comprising:

one or more memories storing processor-executable code; and one or more processors coupled with the one or more memories and individually or collectively operable to execute the code to cause the UE to:

monitor for a control message comprising scheduling information for a downlink message for the UE and comprising command information instructing the UE to perform an operation;

generate feedback associated with the control message based at least in part on the monitoring, the feedback indicating whether the UE successfully decoded the control message, whether the UE successfully received the downlink message, and whether the UE successfully performed the operation; and transmit a feedback message including the generated feedback in accordance with a feedback configuration.

2. The UE of claim 1, wherein, to monitor for the control message, the one or more processors are individually or collectively operable to execute the code to cause the UE to:

receive, in the control message, the command information instructing the UE to switch from a first bandwidth part (BWP) to a second BWP, from a first secondary cell (SCell) dormancy state to a second SCell dormancy state, from a first transmission configuration indication (TCI) state to a second TCI state, from a first search space set group (SSSG) to a second SSSG, from a first minimum scheduling offset to a second minimum scheduling offset, or a combination thereof.

3. The UE of claim 1, wherein the one or more processors are individually or collectively further operable to execute the code to cause the UE to:

receive an indication of the feedback configuration via a radio resource control (RRC) message or a medium access control-control element (MAC-CE).

4. The UE of claim 1, wherein, to monitor for the control message, the one or more processors are individually or collectively operable to execute the code to cause the UE to:

receive the control message in accordance with a subcodebook of a plurality of subcodebooks, wherein each subcodebook of the plurality of subcodebooks is associated with a respective downlink control information (DCI) format, and wherein the feedback is a 2-bit message based at least in part on the subcodebook is associated with a two-bit DCI format.

5. The UE of claim 1, wherein, to monitor for the control message, the one or more processors are individually or collectively operable to execute the code to cause the UE to:

receive, in the control message, a bandwidth part (BWP) indicator, a secondary cell (SCell) dormancy indication, a transmission configuration indication TCI) state indication, a minimum scheduling offset indicator, or a combination thereof.

6. The UE of claim 1, wherein the one or more processors are individually or collectively further operable to execute the code to cause the UE to:

fail to decode the control message based at least in part on the monitoring; and maintain one or more UE operations according to a current bandwidth part (BWP) indicator, a current secondary cell (SCell) dormancy indication, a current transmission configuration indication (TCI) state indication, a current scheduling offset indicator, or a combination thereof based at least in part on a failure to decode the control message.

7. The UE of claim 1, wherein, to generate the feedback, the one or more processors are individually or collectively operable to execute the code to cause the UE to:

generate feedback indicating that the UE successfully decoded the control message, that the UE failed to receive the downlink message, and that the UE successfully performed the operation.

8. The UE of claim 1, wherein the one or more processors are individually or collectively further operable to execute the code to cause the UE to:

receive an indication of whether the UE is to perform the operation instructed by the command information if the UE successfully decodes the control message and if the UE fails to decode the downlink message scheduled by the control message.

9. The UE of claim 1, wherein the one or more processors are individually or collectively further operable to execute the code to cause the UE to:

receive an indication of timing information associated with a time at which the UE is to perform the operation.

10. The UE of claim 1, wherein the scheduling information indicates an absence of the downlink message.

11. The UE of claim 10, wherein the feedback message is a one-bit message based at least in part on the scheduling information indicating the absence of the downlink message.

12. The UE of claim 10, wherein the feedback message is a two-bit message based at least in part on the scheduling information indicating the absence of the downlink message.

13. The UE of claim 1, wherein the one or more processors are individually or collectively further operable to execute the code to cause the UE to:

receive an indication of a downlink assignment index; and successfully decode the control message, wherein the feedback message is a one-bit message based at least in part on successfully decoding the control message and based at least in part on the downlink assignment index being a value of 1.

14. A network entity, comprising:

one or more memories storing processor-executable code; and one or more processors coupled with the one or more memories and individually or collectively operable to execute the code to cause the network entity to:

output a control message comprising scheduling information for a downlink message for a user equipment (UE) and command information instructing the UE to perform an operation; and obtain feedback associated with the control message and in accordance with a feedback configuration, the feedback indicating whether the UE successfully decoded the control message, whether the UE successfully received the downlink message, and whether the UE successfully performed the operation.

15. The network entity of claim 14, wherein, to output the control message, the one or more processors are individually or collectively operable to execute the code to cause the network entity to:

output, in the control message, the command information instructing the UE to switch from a first bandwidth part (BWP) to a second BWP, from a first secondary cell (SCell) dormancy state to a second SCell dormancy state, from a first transmission configuration indication (TCI) state to a second TCI state, from a first search space set group (SSSG) to a second SSSG, from a first minimum scheduling offset to a second minimum scheduling offset, or a combination thereof.

16. The network entity of claim 14, wherein the one or more processors are individually or collectively further operable to execute the code to cause the network entity to:

output an indication of the feedback configuration via a radio resource control (RRC) message or a medium access control-control element (MAC-CE).

17. The network entity of claim 14, wherein, to output the control message, the one or more processors are individually or collectively operable to execute the code to cause the network entity to:

output the control message in accordance with a subcodebook of a plurality of subcodebooks, wherein each subcodebook of the plurality of subcodebooks is associated with a respective downlink control information (DCI) format, and wherein the feedback is a 2-bit message based at least in part on the subcodebook is associated with a two-bit DCI format.

18. The network entity of claim 14, wherein, to output the control message, the one or more processors are individually or collectively operable to execute the code to cause the network entity to:

output, in the control message, a bandwidth part (BWP) indicator, a secondary cell (SCell) dormancy indication, a transmission configuration indication (TCI) state indication, a minimum scheduling offset indicator, or a combination thereof.

19. The network entity of claim 14, wherein, to obtain the feedback, the one or more processors are individually or collectively operable to execute the code to cause the network entity to:

obtain feedback indicating that the UE successfully decoded the control message, that the UE failed to receive the downlink message, and that the UE successfully performed the operation.

20. The network entity of claim 14, wherein the one or more processors are individually or collectively further operable to execute the code to cause the network entity to:

output an indication of whether the UE is to perform the operation instructed by the command information if the UE successfully decodes the control message and if the UE fails to decode the downlink message scheduled by the control message.

21. The network entity of claim 14, wherein the one or more processors are individually or collectively further operable to execute the code to cause the network entity to:

output an indication of timing information associated with a time at which the UE is to perform the operation.

22. The network entity of claim 14, wherein the scheduling information indicates an absence of the downlink message.

23. The network entity of claim 22, wherein the feedback is a one-bit message based at least in part on the scheduling information indicating the absence of the downlink message.

24. The network entity of claim 22, wherein the feedback is a two-bit message based at least in part on the scheduling information indicating the absence of the downlink message.

25. The network entity of claim 14, wherein the one or more processors are individually or collectively further operable to execute the code to cause the network entity to:

output an indication of a downlink assignment index, wherein the feedback is a one-bit message based at least in part on the feedback indicating that the UE successfully decoded the control message and based at least in part on the downlink assignment index being a value of 1.

26. A method for wireless communications at a user equipment (UE), comprising:

monitoring for a control message comprising scheduling information for a downlink message for the UE and comprising command information instructing the UE to perform an operation;

generating feedback associated with the control message based at least in part on the monitoring, the feedback indicating whether the UE successfully decoded the control message, whether the UE successfully received the downlink message, and whether the UE successfully performed the operation; and transmitting a feedback message including the generated feedback in accordance with a feedback configuration.

27. The method of claim 26, wherein monitoring for the control message comprises:

receiving, in the control message, the command information instructing the UE to switch from a first bandwidth part (BWP) to a second BWP, from a first secondary cell (SCell) dormancy state to a second SCell dormancy state, from a first transmission configuration indication (TCI) state to a second TCI state, from a first search space set group (SSSG) to a second SSSG, from a first minimum scheduling offset to a second minimum scheduling offset, or a combination thereof.

28. The method of claim 26, further comprising:

receiving an indication of the feedback configuration via a radio resource control (RRC) message or a medium access control-control element (MAC-CE).

29. A method for wireless communications at a network entity, comprising:

outputting a control message comprising scheduling information for a downlink message for a user equipment (UE) and command information instructing the UE to perform an operation; and obtaining feedback associated with the control message and in accordance with a feedback configuration, the feedback indicating whether the UE successfully decoded the control message, whether the UE successfully received the downlink message, and whether the UE successfully performed the operation.

30. The method of claim 29, wherein outputting the control message comprises:

outputting, in the control message, the command information instructing the UE to switch from a first bandwidth part (BWP) to a second BWP, from a first secondary cell (SCell) dormancy state to a second SCell dormancy state, from a first transmission configuration indication (TCI) state to a second TCI state, from a first search space set group (SSSG) to a second SSSG, from a first minimum scheduling offset to a second minimum scheduling offset, or a combination thereof.

* * * * *